(12) United States Patent
Esswie

(10) Patent No.: US 12,563,572 B2
(45) Date of Patent: Feb. 24, 2026

(54) ARTIFICIAL INTELLIGENCE MODEL DELIVERY VIA RADIO CONTROL PLANE

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 18/296,971

(22) Filed: Apr. 6, 2023

(65) Prior Publication Data

US 2024/0340913 A1    Oct. 10, 2024

(51) Int. Cl.
*H04W 72/231*    (2023.01)
*H04L 1/00*    (2006.01)

(52) U.S. Cl.
CPC ......... *H04W 72/231* (2023.01); *H04L 1/0009* (2013.01)

(58) Field of Classification Search
CPC ............ G06F 21/00; H04L 9/08; H04W 8/22; H04W 36/36; H04W 24/02; H04W 48/14; H04W 76/02; H04W 64/003
See application file for complete search history.

(56) References Cited

U.S. PATENT DOCUMENTS

| | | | |
|---|---|---|---|
| 2002/0126675 A1 | 9/2002 | Yoshimura et al. | |
| 2003/0035440 A1 | 2/2003 | Casaccia et al. | |
| 2007/0076680 A1 | 4/2007 | Amram et al. | |
| 2019/0082424 A1 * | 3/2019 | Nammi ................. | H04W 28/06 |

| | | |
|---|---|---|
| 2019/0116216 A1 | 4/2019 | Liu et al. |
| 2020/0146093 A1 | 5/2020 | Zhang et al. |
| 2021/0160149 A1 | 5/2021 | Ma et al. |
| 2021/0160879 A1 | 5/2021 | Lin et al. |
| 2021/0191806 A1 | 6/2021 | Pan |

(Continued)

FOREIGN PATENT DOCUMENTS

| | | |
|---|---|---|
| WO | 2021/206594 | 10/2021 |
| WO | 2022/151064 | 7/2022 |

OTHER PUBLICATIONS

International Search Report and Written Opinion for PCT Application No. PCT/US2023/036167 mailed Mar. 4, 2024, 18 pages.

(Continued)

*Primary Examiner* — Iqbal Zaidi
(74) *Attorney, Agent, or Firm* — Amin, Turocy & Watson, LLP

(57)    ABSTRACT

A radio access network node may determine to update an artificial intelligence machine learning model at a user equipment. The node may transmit the model in a radio resource control message that comprises a primary portion and a secondary portion. The primary portion may be used to transmit control information. The secondary portion may be used to transmit the model, or other data. The control message may comprise a format indication indicative of a code rate to be used by the user equipment to decode the primary portion. The radio resource control message may comprise a secondary format indication indicative of a code rate to be used to decode the secondary portion. A format indication may comprise a retransmission indication indicative of retransmission of one or more segments of either, or both, of the primary portion or secondary portion being enabled.

20 Claims, 21 Drawing Sheets

(56) References Cited

U.S. PATENT DOCUMENTS

| | | | |
|---|---|---|---|
| 2021/0359782 A1* | 11/2021 | Park | H04L 1/0032 |
| 2023/0353283 A1 | 11/2023 | Tian et al. | |
| 2023/0362660 A1* | 11/2023 | Chaki | H04W 72/541 |
| 2023/0422271 A1 | 12/2023 | Tang et al. | |

OTHER PUBLICATIONS

International Search Report and Written Opinion for PCT Application No. PCT/US2023/036171 mailed Mar. 4, 2024, 17 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.331—"5G; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.300—"5G; NR; NR and NG-RAN Overall description; Stage-2" 3GPP TS 38.300 version 16.4.0 Release 16, Jan. 2021, 151 pages.

Esswie, Ali. "Artificial Intelligence Model Delivery Via Radio Control Plane" U.S. Appl. No. 18/296,979, filed Apr. 6, 2023, 93 pages.

Office Action mailed Aug. 26, 2025 for U.S. Appl. No. 18/296,979, 57 pages.

"3rd Generation Partnership Project; Technical Specification Group Services and System Aspects; Release 18 Description; Summary of Rel-18 Work Items (Release 18)" TR 21.918 V18.0.0, Mar. 2025, 228 pages.

Notice of Allowance mailed Jan. 13, 2026 for U.S. Appl. No. 18/296,979, 59 pages.

Notification Concerning Transmittal of International Preliminary Report on Patentability for PCT Application No. PCT/US2023/036171 mailed Oct. 16, 2025, 10 pages.

European Office Action mailed Nov. 27, 2025 for European Patent Application No. 23813149.4, 3 pages.

* cited by examiner

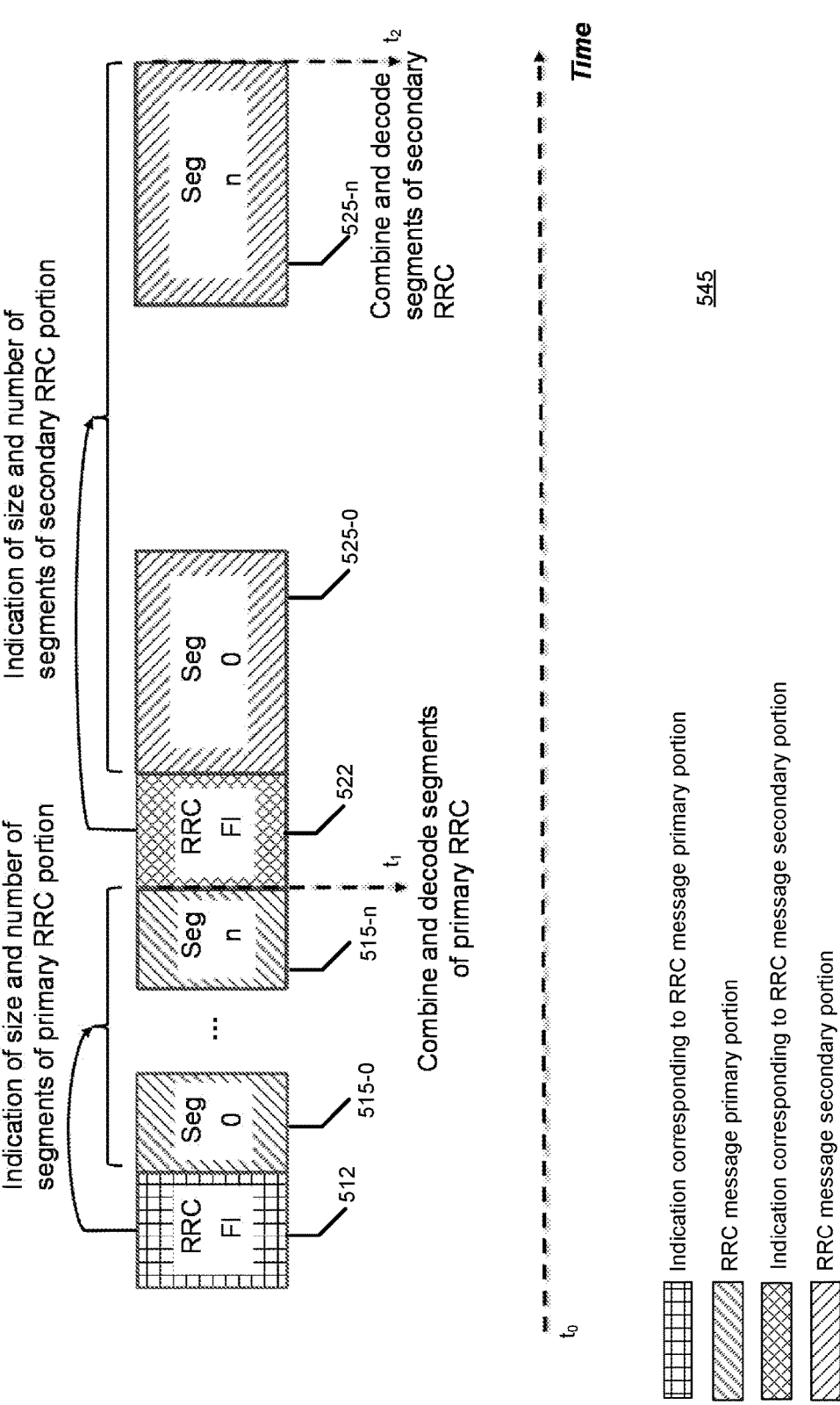

Indication of size and number of segments of secondary RRC portion

Indication of size and number of segments of primary RRC portion

Seg n  525-n

Seg 0  525-0

RRC FI  522

Seg n  515-n

Seg 0  515-0

RRC FI  512

Combine and decode segments of secondary RRC

Combine and decode segments of primary RRC t₂ t₁ t₀

Time

545

Indication corresponding to RRC message primary portion

RRC message primary portion

Indication corresponding to RRC message secondary portion

RRC message secondary portion

FIG. 5B

Primary/secondary RRC segment retransmission request, as part of RRC setup request signaling

- RRC setup configurations
- ..
- RRC retransmission request
  - RRC process ID 1 {primary, secondary1, secondary2, ...}
    - Segment IDs or numbers to be retransmitted
  - RRC process ID 2 {primary, secondary1, secondary2, ...}
    - Segment IDs or numbers to be retransmitted
  - ..

710

715
720
725
730

700

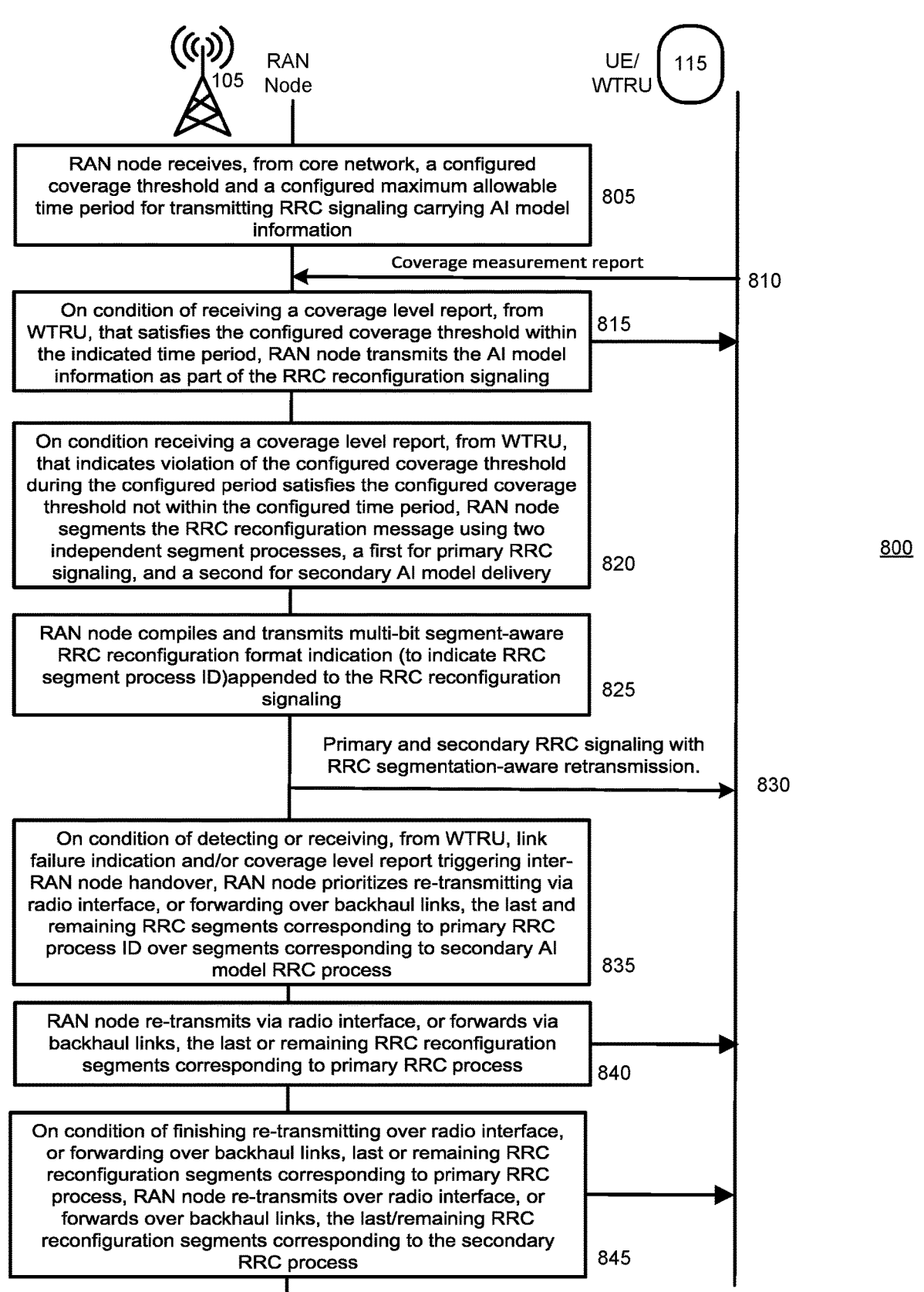

RAN 105 Node

UE/ WTRU 115

RAN node receives, from core network, a configured coverage threshold and a configured maximum allowable time period for transmitting RRC signaling carrying AI model information   805

Coverage measurement report   810

On condition of receiving a coverage level report, from WTRU, that satisfies the configured coverage threshold within the indicated time period, RAN node transmits the AI model information as part of the RRC reconfiguration signaling   815

On condition receiving a coverage level report, from WTRU, that indicates violation of the configured coverage threshold during the configured period satisfies the configured coverage threshold not within the configured time period, RAN node segments the RRC reconfiguration message using two independent segment processes, a first for primary RRC signaling, and a second for secondary AI model delivery   820

RAN node compiles and transmits multi-bit segment-aware RRC reconfiguration format indication (to indicate RRC segment process ID)appended to the RRC reconfiguration signaling   825

Primary and secondary RRC signaling with RRC segmentation-aware retransmission.   830

On condition of detecting or receiving, from WTRU, link failure indication and/or coverage level report triggering inter-RAN node handover, RAN node prioritizes re-transmitting via radio interface, or forwarding over backhaul links, the last and remaining RRC segments corresponding to primary RRC process ID over segments corresponding to secondary AI model RRC process   835

RAN node re-transmits via radio interface, or forwards via backhaul links, the last or remaining RRC reconfiguration segments corresponding to primary RRC process   840

On condition of finishing re-transmitting over radio interface, or forwarding over backhaul links, last or remaining RRC reconfiguration segments corresponding to primary RRC process, RAN node re-transmits over radio interface, or forwards over backhaul links, the last/remaining RRC reconfiguration segments corresponding to the secondary RRC process   845

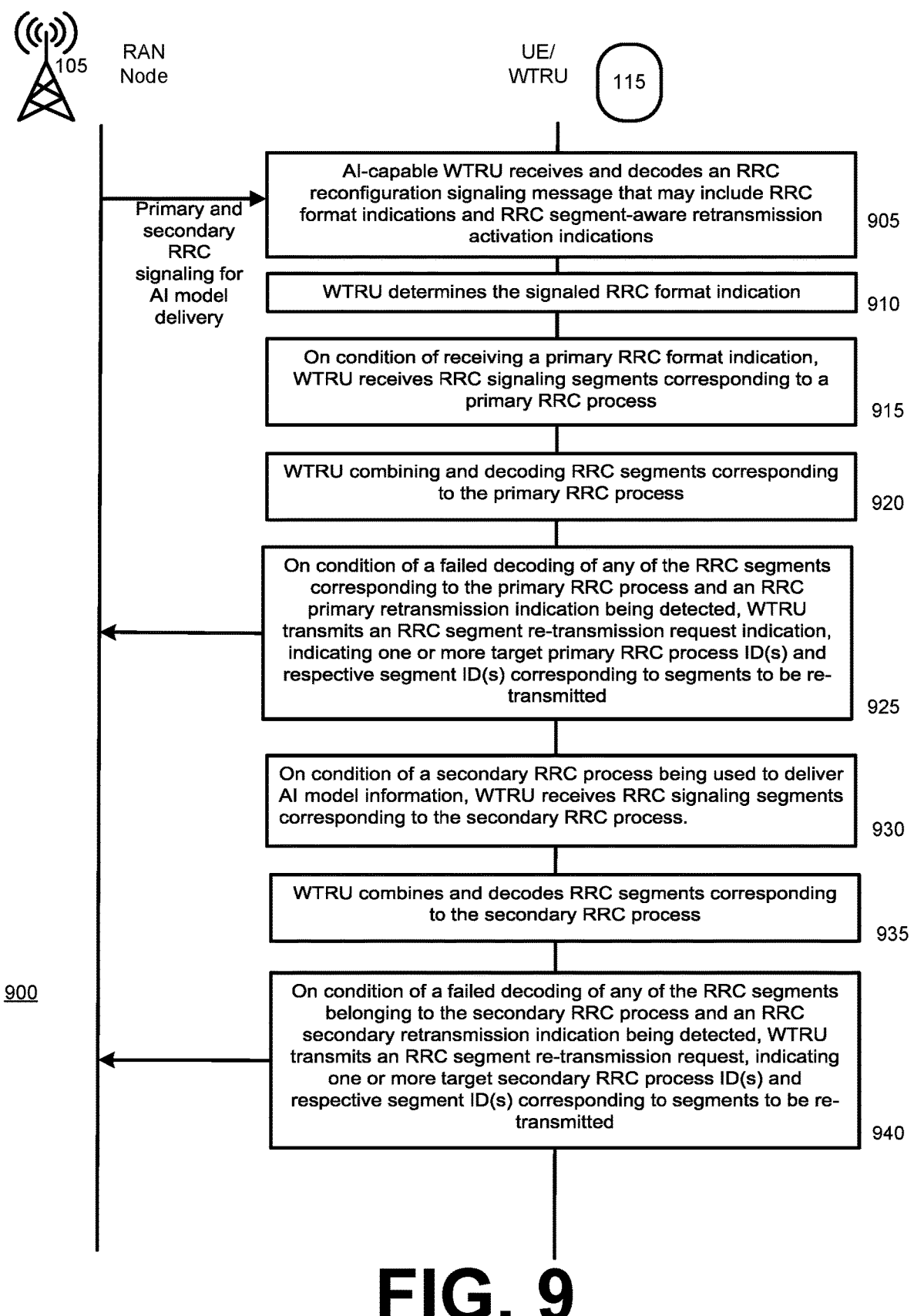

RAN
Node    105

UE/
WTRU    115

Primary and
secondary
RRC
signaling for
AI model
delivery

AI-capable WTRU receives and decodes an RRC
reconfiguration signaling message that may include RRC
format indications and RRC segment-aware retransmission
activation indications    905

WTRU determines the signaled RRC format indication    910

On condition of receiving a primary RRC format indication,
WTRU receives RRC signaling segments corresponding to a
primary RRC process    915

WTRU combining and decoding RRC segments corresponding
to the primary RRC process    920

On condition of a failed decoding of any of the RRC segments
corresponding to the primary RRC process and an RRC
primary retransmission indication being detected, WTRU
transmits an RRC segment re-transmission request indication,
indicating one or more target primary RRC process ID(s) and
respective segment ID(s) corresponding to segments to be re-
transmitted    925

On condition of a secondary RRC process being used to deliver
AI model information, WTRU receives RRC signaling segments
corresponding to the secondary RRC process.    930

WTRU combines and decodes RRC segments corresponding
to the secondary RRC process    935

900

On condition of a failed decoding of any of the RRC segments
belonging to the secondary RRC process and an RRC
secondary retransmission indication being detected, WTRU
transmits an RRC segment re-transmission request, indicating
one or more target secondary RRC process ID(s) and
respective segment ID(s) corresponding to segments to be re-
transmitted    940

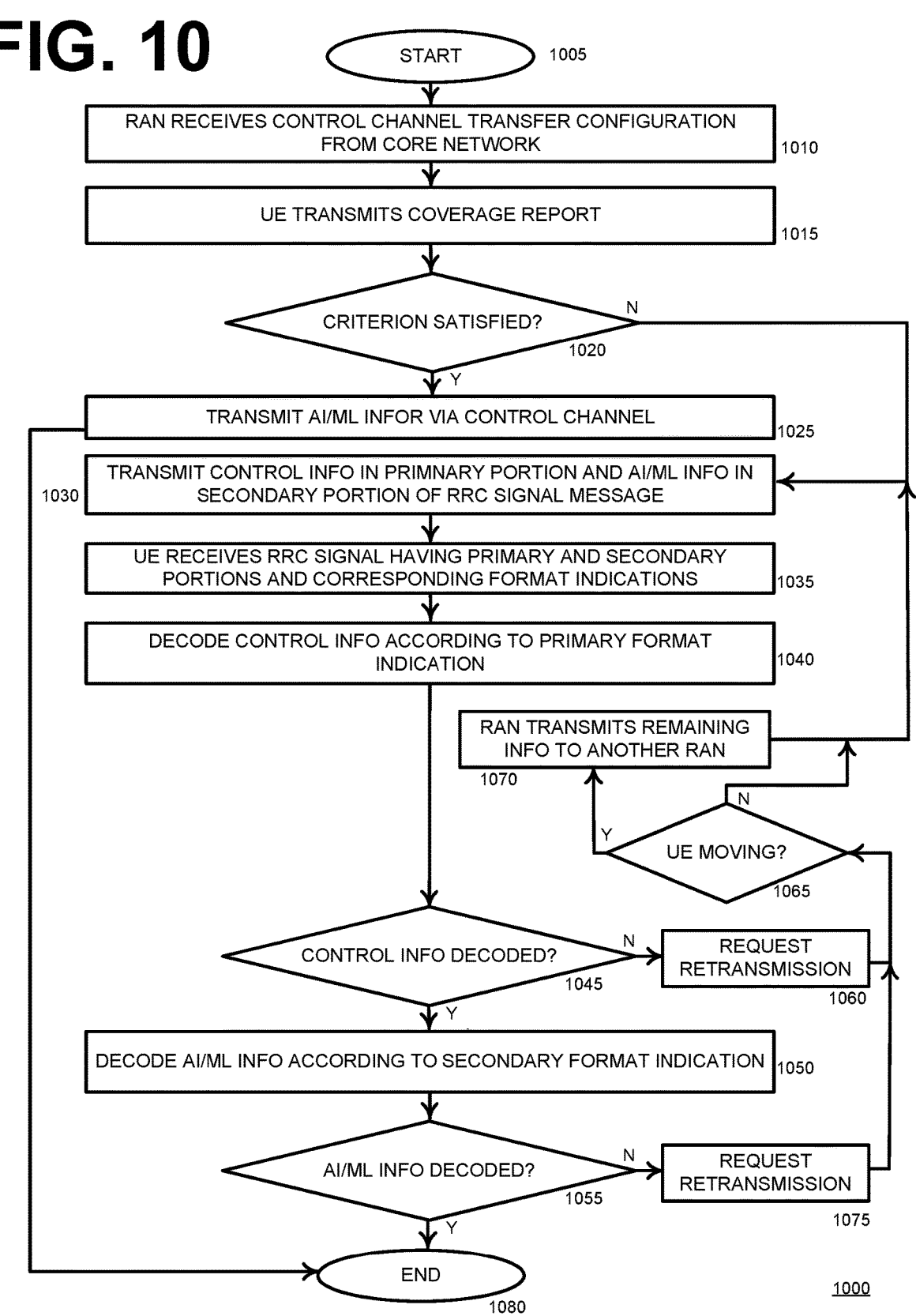

START          1005

RAN RECEIVES CONTROL CHANNEL TRANSFER CONFIGURATION FROM CORE NETWORK          1010

UE TRANSMITS COVERAGE REPORT          1015

CRITERION SATISFIED?          N          1020          Y

TRANSMIT AI/ML INFOR VIA CONTROL CHANNEL          1025

TRANSMIT CONTROL INFO IN PRIMNARY PORTION AND AI/ML INFO IN SECONDARY PORTION OF RRC SIGNAL MESSAGE          1030

UE RECEIVES RRC SIGNAL HAVING PRIMARY AND SECONDARY PORTIONS AND CORRESPONDING FORMAT INDICATIONS          1035

DECODE CONTROL INFO ACCORDING TO PRIMARY FORMAT INDICATION          1040

RAN TRANSMITS REMAINING INFO TO ANOTHER RAN          1070

UE MOVING?          Y          N          1065

CONTROL INFO DECODED?          N          1045          Y

REQUEST RETRANSMISSION          1060

DECODE AI/ML INFO ACCORDING TO SECONDARY FORMAT INDICATION          1050

AI/ML INFO DECODED?          N          1055          Y

REQUEST RETRANSMISSION          1075

END          1080

1000

Figure 11:
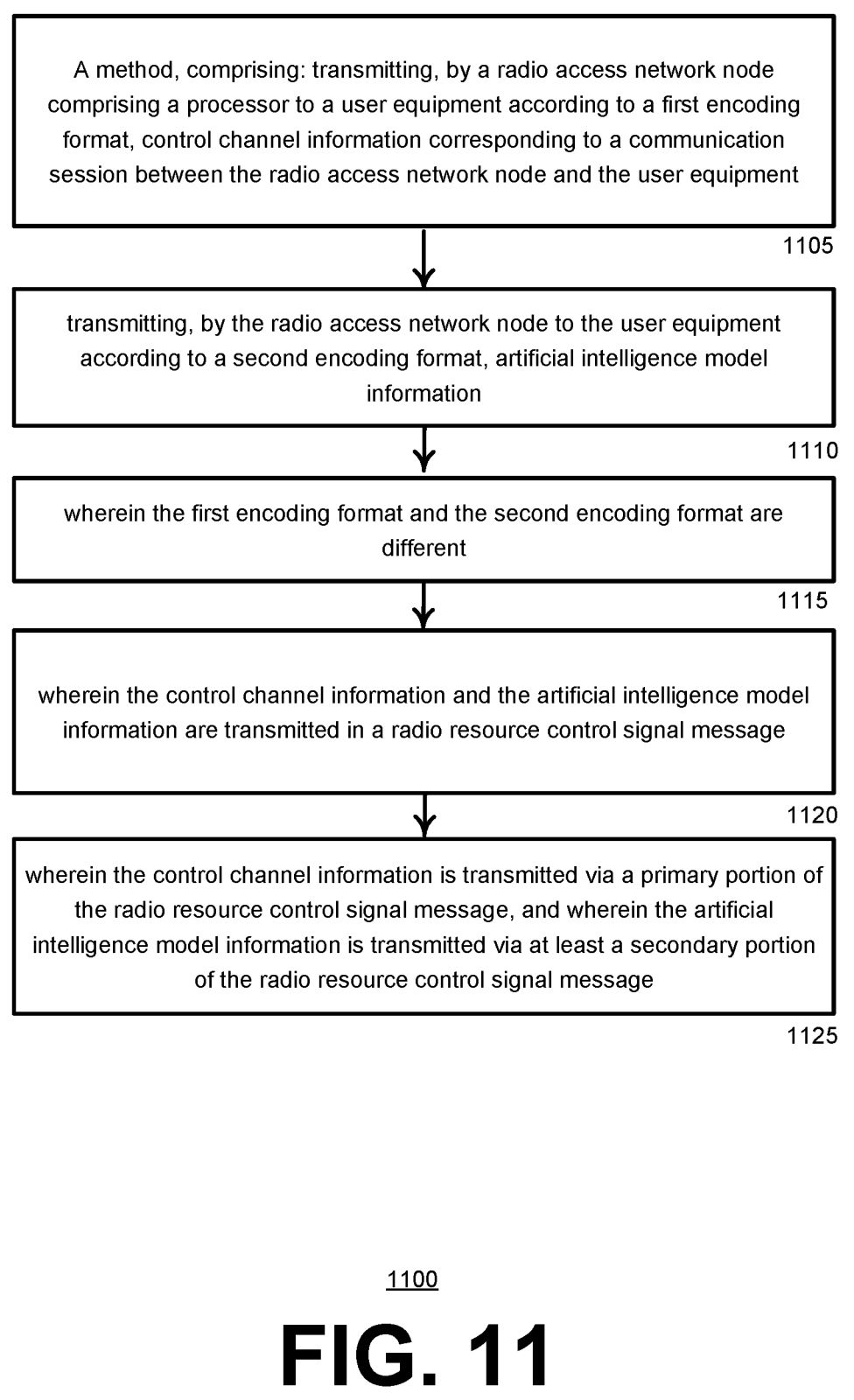

A method, comprising: transmitting, by a radio access network node comprising a processor to a user equipment according to a first encoding format, control channel information corresponding to a communication session between the radio access network node and the user equipment

1105 transmitting, by the radio access network node to the user equipment according to a second encoding format, artificial intelligence model information

1110 wherein the first encoding format and the second encoding format are different

1115 wherein the control channel information and the artificial intelligence model information are transmitted in a radio resource control signal message

1120 wherein the control channel information is transmitted via a primary portion of the radio resource control signal message, and wherein the artificial intelligence model information is transmitted via at least a secondary portion of the radio resource control signal message

Figure 12:
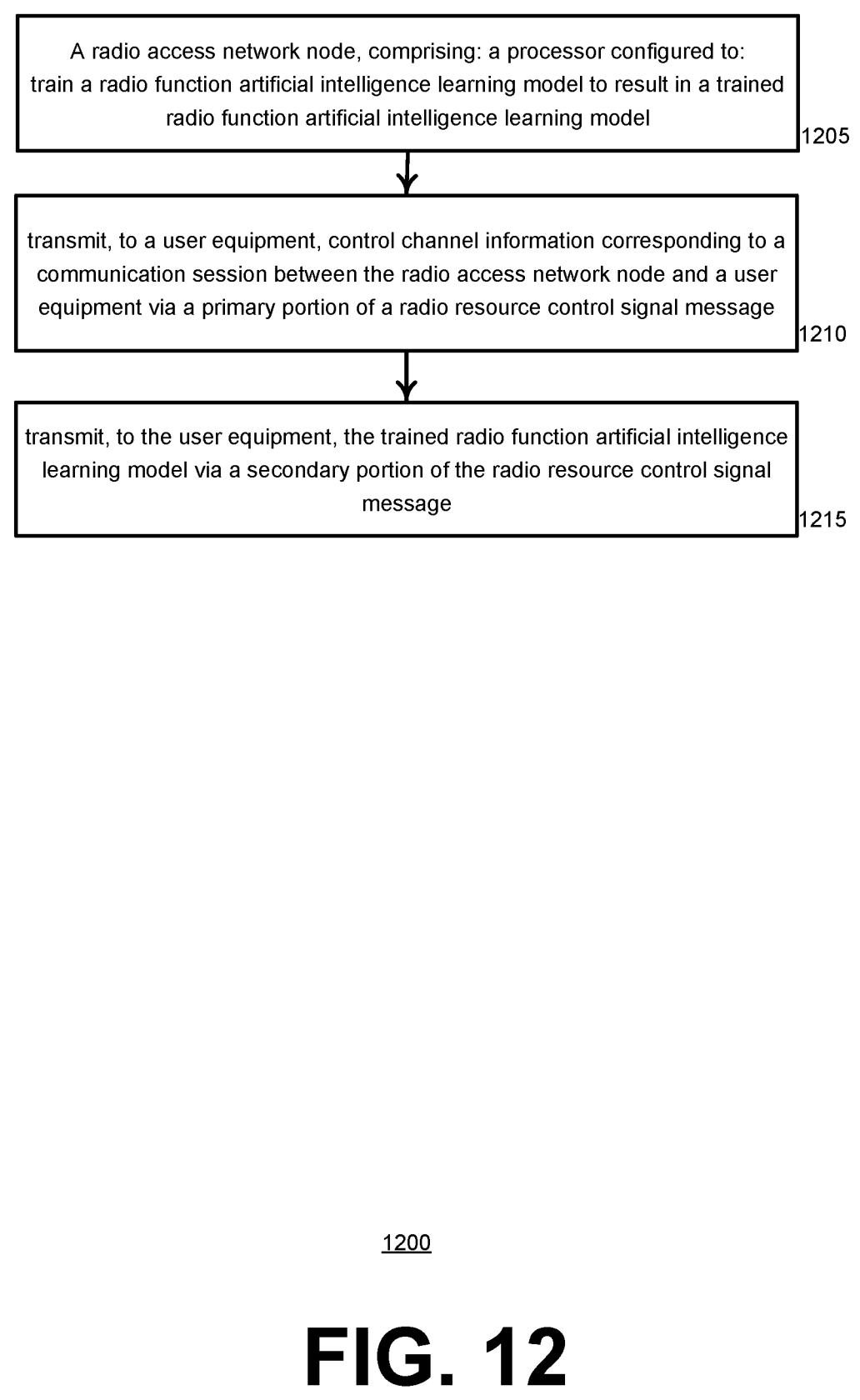

A radio access network node, comprising: a processor configured to:
train a radio function artificial intelligence learning model to result in a trained
radio function artificial intelligence learning model

1205 transmit, to a user equipment, control channel information corresponding to a
communication session between the radio access network node and a user
equipment via a primary portion of a radio resource control signal message

1210 transmit, to the user equipment, the trained radio function artificial intelligence
learning model via a secondary portion of the radio resource control signal
message

Figure 13:
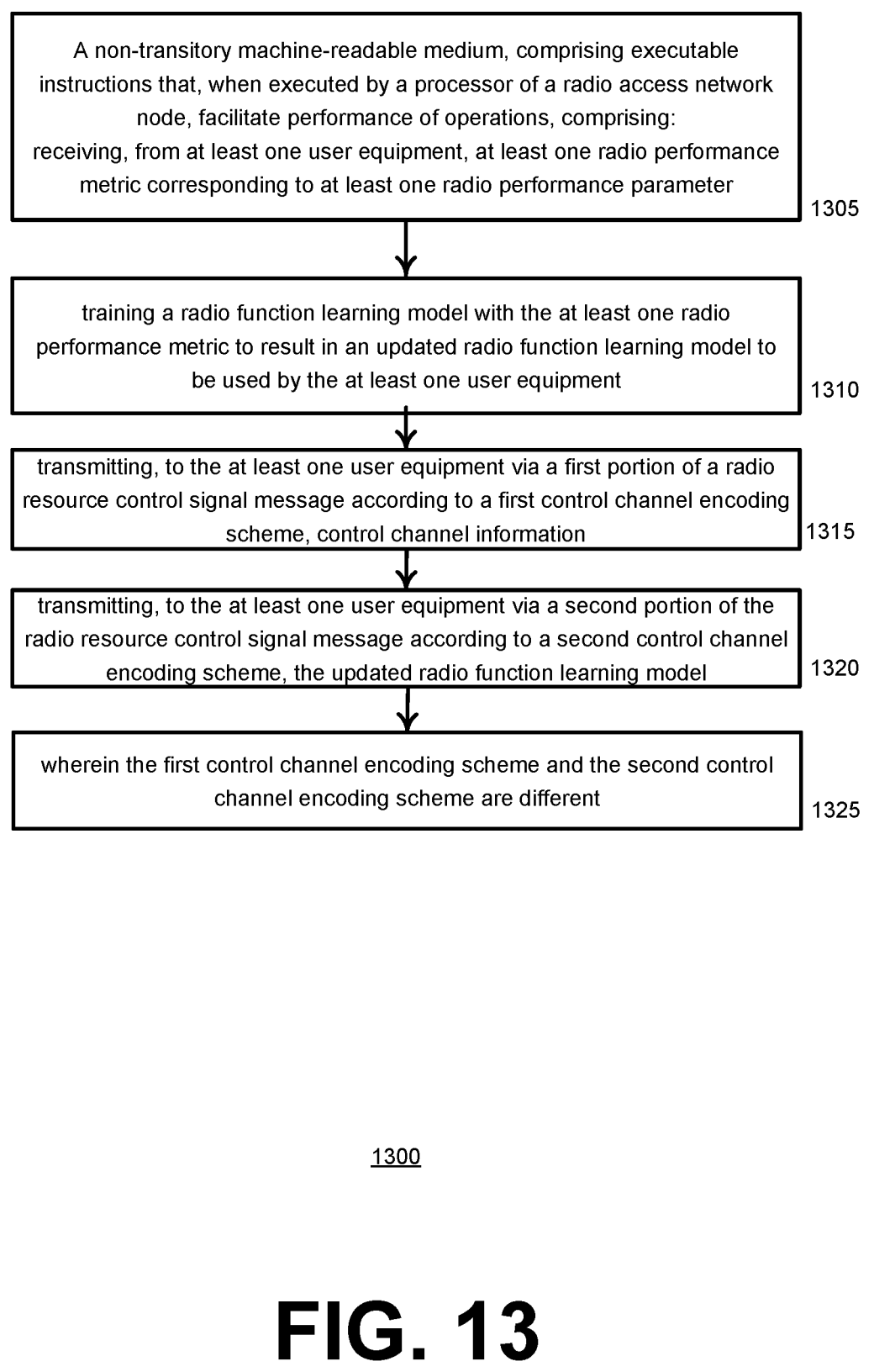

A non-transitory machine-readable medium, comprising executable instructions that, when executed by a processor of a radio access network node, facilitate performance of operations, comprising:
receiving, from at least one user equipment, at least one radio performance metric corresponding to at least one radio performance parameter

1305 training a radio function learning model with the at least one radio performance metric to result in an updated radio function learning model to be used by the at least one user equipment

1310 transmitting, to the at least one user equipment via a first portion of a radio resource control signal message according to a first control channel encoding scheme, control channel information

1315 transmitting, to the at least one user equipment via a second portion of the radio resource control signal message according to a second control channel encoding scheme, the updated radio function learning model

1320 wherein the first control channel encoding scheme and the second control channel encoding scheme are different

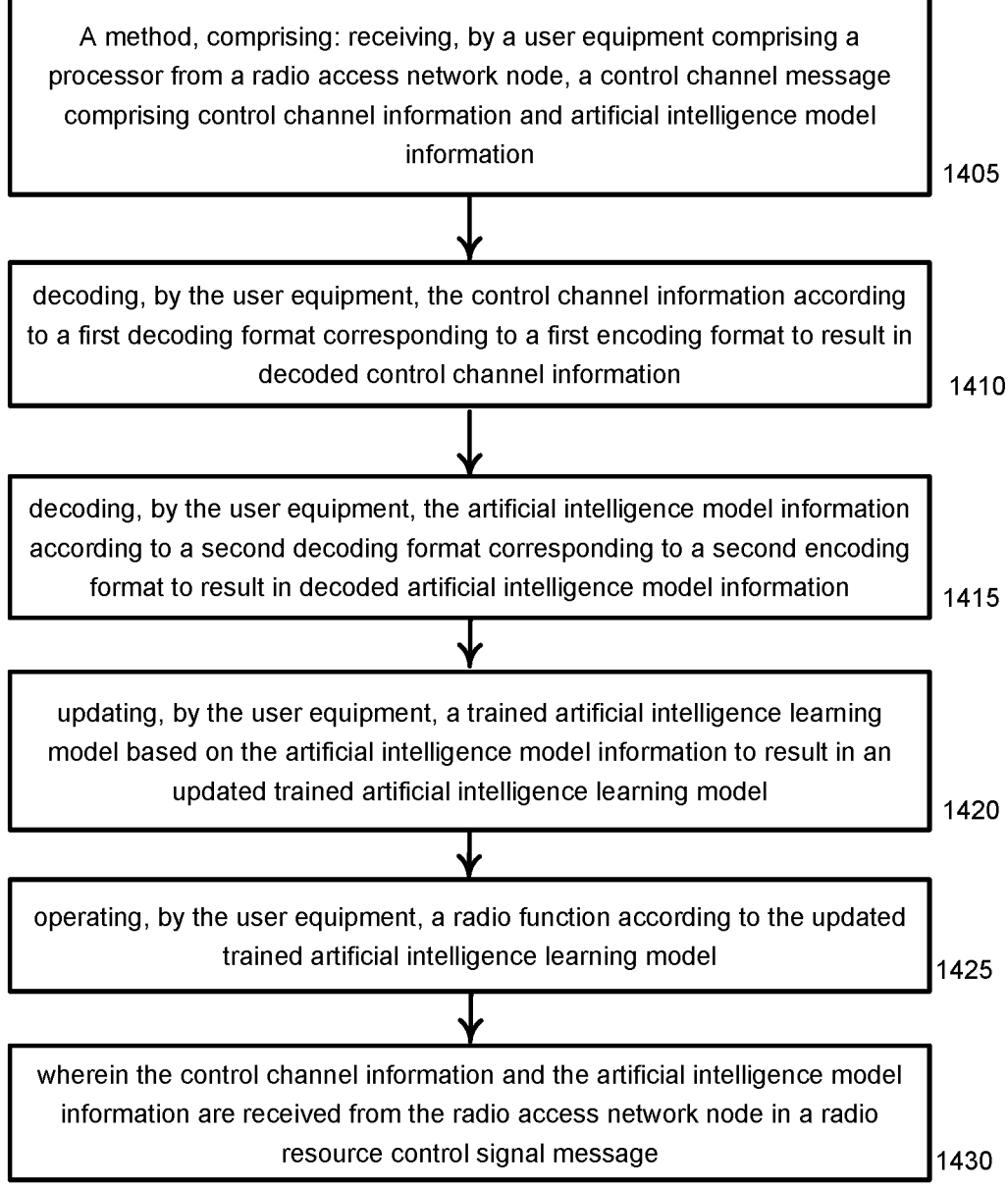

A method, comprising: receiving, by a user equipment comprising a processor from a radio access network node, a control channel message comprising control channel information and artificial intelligence model information

1405 decoding, by the user equipment, the control channel information according to a first decoding format corresponding to a first encoding format to result in decoded control channel information

1410 decoding, by the user equipment, the artificial intelligence model information according to a second decoding format corresponding to a second encoding format to result in decoded artificial intelligence model information

1415 updating, by the user equipment, a trained artificial intelligence learning model based on the artificial intelligence model information to result in an updated trained artificial intelligence learning model

1420 operating, by the user equipment, a radio function according to the updated trained artificial intelligence learning model

1425 wherein the control channel information and the artificial intelligence model information are received from the radio access network node in a radio resource control signal message

Figure 15:
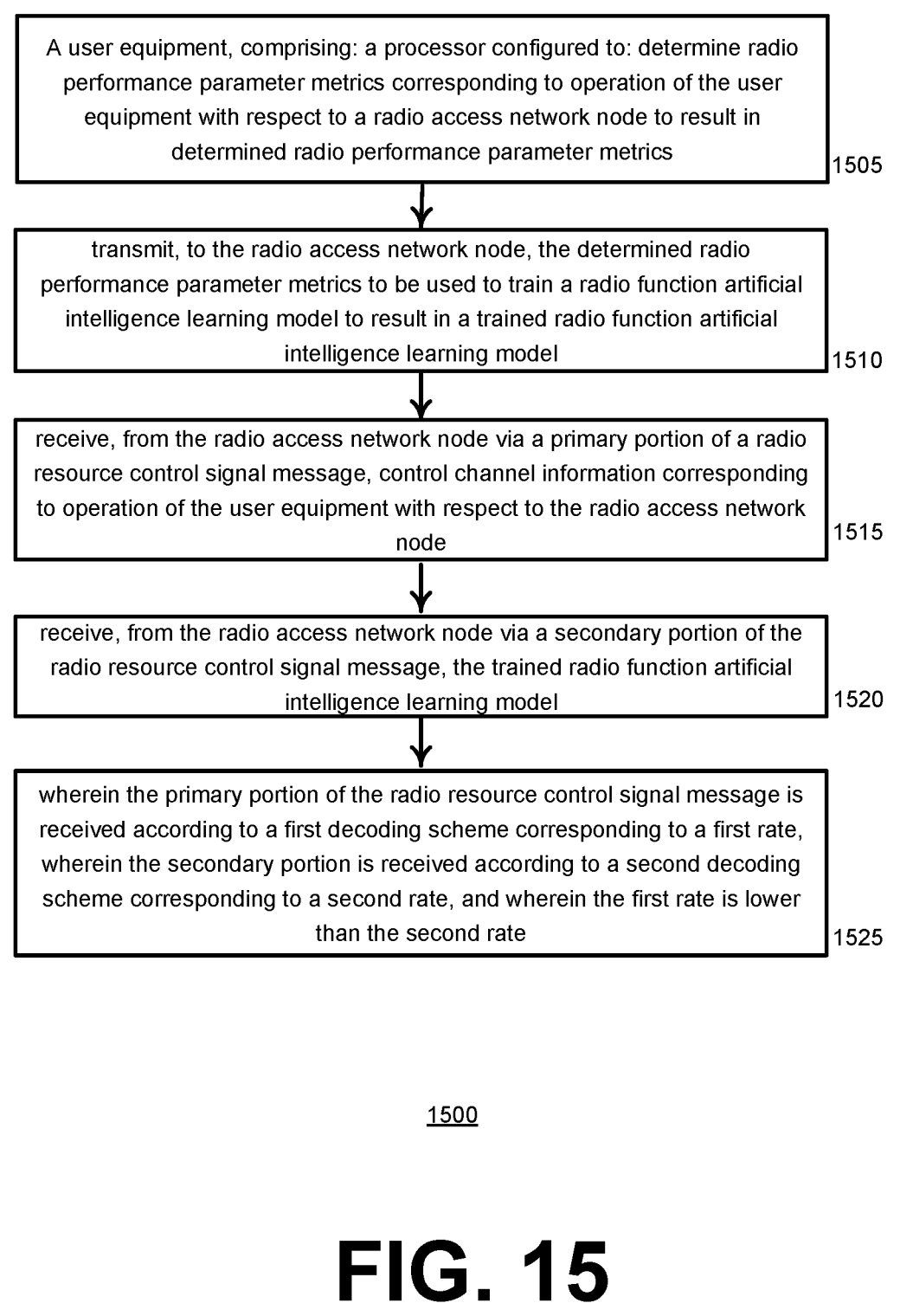

A user equipment, comprising: a processor configured to: determine radio performance parameter metrics corresponding to operation of the user equipment with respect to a radio access network node to result in determined radio performance parameter metrics

1505 transmit, to the radio access network node, the determined radio performance parameter metrics to be used to train a radio function artificial intelligence learning model to result in a trained radio function artificial intelligence learning model

1510 receive, from the radio access network node via a primary portion of a radio resource control signal message, control channel information corresponding to operation of the user equipment with respect to the radio access network node

1515 receive, from the radio access network node via a secondary portion of the radio resource control signal message, the trained radio function artificial intelligence learning model

1520 wherein the primary portion of the radio resource control signal message is received according to a first decoding scheme corresponding to a first rate, wherein the secondary portion is received according to a second decoding scheme corresponding to a second rate, and wherein the first rate is lower than the second rate

Figure 16:
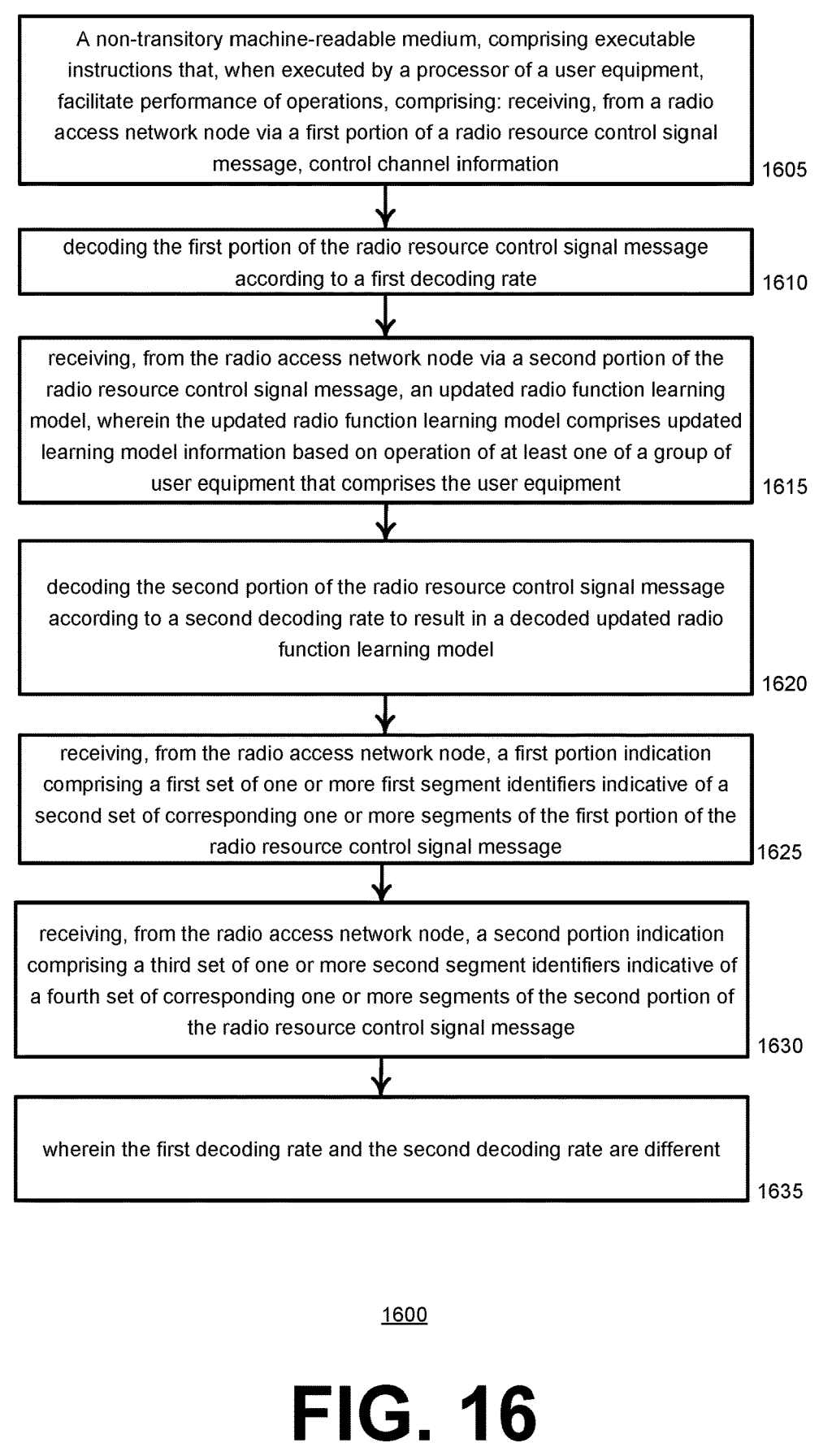

A non-transitory machine-readable medium, comprising executable instructions that, when executed by a processor of a user equipment, facilitate performance of operations, comprising: receiving, from a radio access network node via a first portion of a radio resource control signal message, control channel information

1605

↓ decoding the first portion of the radio resource control signal message according to a first decoding rate

1610

↓ receiving, from the radio access network node via a second portion of the radio resource control signal message, an updated radio function learning model, wherein the updated radio function learning model comprises updated learning model information based on operation of at least one of a group of user equipment that comprises the user equipment

1615

↓ decoding the second portion of the radio resource control signal message according to a second decoding rate to result in a decoded updated radio function learning model

1620

↓ receiving, from the radio access network node, a first portion indication comprising a first set of one or more first segment identifiers indicative of a second set of corresponding one or more segments of the first portion of the radio resource control signal message

1625

↓ receiving, from the radio access network node, a second portion indication comprising a third set of one or more second segment identifiers indicative of a fourth set of corresponding one or more segments of the second portion of the radio resource control signal message

1630

↓ wherein the first decoding rate and the second decoding rate are different

ARTIFICIAL INTELLIGENCE MODEL DELIVERY VIA RADIO CONTROL PLANE

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise transmitting, by a radio access network node comprising a processor to a user equipment according to a first encoding format, control channel information corresponding to a communication session between the radio access network node and the user equipment, and transmitting, by the radio access network node to the user equipment according to a second encoding format, artificial intelligence ("AI") model information, wherein the first encoding format and the second encoding format are different. The first encoding format may correspond to, or may be indicative of, a first rate, wherein the second encoding format may correspond to, or may be indicative of, a second rate, and wherein the first rate is lower than the second rate. Thus, the control channel information may be transmitted with a higher reliability due to the slower, or lower, rate, and the larger AI model information may be delivered more quickly, but with less reliability, which may result in a need to retransmit a portion, or segment, of the AI model information.

The control channel information and the artificial intelligence model information may be transmitted in a radio resource control ("RRC") signal message. The control channel information and the artificial intelligence model information may be transmitted in a control channel message. The radio resource control signal message may comprise a radio resource control signal message format indication indicative of the first encoding format. The radio resource control signal message may comprise a radio resource control signal message format indication indicative of the second encoding format. In an embodiment, the radio resource control signal message may comprise separate format indications corresponding separately to the control information or the AI model information. In an embodiment, a single control channel message may comprise a format indication indicative of the first rate used to transmit the control information and the single control channel message may also be indicative of the second rate used to transmit the AI model information.

The control channel information may be transmitted via a primary portion of the radio resource control signal message, and the artificial intelligence model information may be transmitted via a secondary portion and a tertiary portion of the radio resource control signal message. A secondary and tertiary format indication may be indicative of format, cording rates, or other parameter information used to transmit, or that are to be used to decode, information transmitted in the secondary or tertiary portions.

In an embodiment, the control channel information may be transmitted via a primary portion of the radio resource control signal message, and the artificial intelligence model information may be transmitted via at least a secondary portion of the radio resource control signal message. The radio resource control signal message may comprise a first radio resource format indication indicative of a first number of control channel signal segments used to transmit the control channel information in the primary portion of the radio resource control signal message. The radio resource control signal message may comprise a second radio resource format indication indicative of second control channel signal segments used to transmit the artificial intelligence model information in the secondary portion of the radio resource control signal message.

In an embodiment, the control channel information may be transmitted in a first radio resource control signal message and the artificial intelligence model information may be transmitted in a second radio resource control signal message. The first radio resource control signal message may comprise a radio resource format indication indicative of control channel signal segments used to transmit the artificial intelligence model information in the second radio resource control signal message.

In an embodiment, the control channel information and the artificial intelligence model information may be transmitted in a radio resource control signal message, wherein the control channel information is transmitted via a primary portion of the radio resource control signal message and wherein the artificial intelligence model information is transmitted via a secondary portion of the radio resource control signal message. The radio resource control signal message may comprise a first radio resource format indication indicative of a first set of one or more first control channel signal segments used to transmit the control channel information via the primary portion of the radio resource control signal message, and the first radio resource format indication may be indicative of a second set of one or more first sequential segment identifiers corresponding, respectively, to the first set of one or more first control channel signal segments. The radio resource control signal message may comprise a second radio resource format indication indicative of a third set of one or more second control channel signal segments used to transmit the artificial intelligence model information via the secondary portion of the radio resource control signal message, and the second radio resource format indication may be indicative of a fourth set of one or more second sequential segment identifiers corresponding, respectively, to the third set of one or more second control channel signal segments. In an embodiment, a first first sequential segment identifier of the second set of one or more first sequential segment identifiers is the same as a first second sequential segment identifier of the fourth set of one or more second sequential segment identifiers. In other words, a segment corresponding to the primary portion of the radio resource control signal message may be identified by an identifier having the same sequential number as a segment of the second portion of the radio resource control signal message.

In another example embodiment, a radio access network node may comprise a processor configured to train a radio function artificial intelligence learning model to result in a trained radio function artificial intelligence learning model. The processor may be configured to transmit, to a user equipment, control channel information corresponding to a communication session between the radio access network node and a user equipment via a primary portion of a radio resource control signal message, and the processor may be configured to transmit, to the user equipment, the trained radio function artificial intelligence learning model via a secondary portion of the radio resource control signal message. Thus, the trained radio function artificial intelligence learning model may be transmitted to the user equipment via the same RRC signal message in which control channel information is transmitted.

In an embodiment, the primary portion of the radio resource control signal message may be transmitted according to a first encoding format corresponding to a first reliability and the secondary portion of the radio resource control signal message is transmitted according to a second encoding format corresponding to a second reliability. In an embodiment, the second reliability is lower than the first reliability.

In an embodiment, the radio resource control signal message may comprise a first radio resource format indication indicative of a first control channel signal segment used to transmit the control channel information via the primary portion of the radio resource control signal message and the radio resource control signal message may comprise a second radio resource format indication indicative of a second control channel signal segment used to transmit the radio function artificial intelligence learning model via the secondary portion of the radio resource control signal message.

In an embodiment, the first radio resource format indication may comprise a first segment identifier corresponding to the first control channel signal segment used to transmit the control channel information via the primary portion of the radio resource control signal message. The second radio resource format indication may comprise a second segment identifier corresponding to the second control channel signal segment used to transmit the radio function artificial intelligence learning model via the secondary portion of the radio resource control signal message. The radio resource control signal message may comprise a retransmission enablement indication to be indicative to the user equipment that requesting, by the user equipment, retransmission of the first control channel signal segment or the second control channel signal segment is enabled. Thus, a user equipment may be configured, via a retransmission enablement indication, to request retransmission of less than all of control information transmitted in the primary portion of the RRC signal message or less than all of the AI model information transmitted in the secondary portion of the RRC signal message by transmitting to the radio access network node a retransmission request and a segment identifier corresponding to a segment that the user equipment may determine was not received without error.

In an embodiment, a non-transitory machine-readable medium may comprising executable instructions that, when executed by a processor of a radio access network node, facilitate performance of operations, comprising receiving, from at least one user equipment, at least one radio performance metric corresponding to at least one radio performance parameter and training a radio function learning model with the at least one radio performance metric to result in an updated radio function learning model to be used by the at least one user equipment. The operations may comprise transmitting, to the at least one user equipment via a first portion of a radio resource control signal message according to a first control channel encoding scheme, control channel information, and the operations may comprise transmitting, to the at least one user equipment via a second portion of the radio resource control signal message according to a second control channel encoding scheme, the updated radio function learning model. The first control channel encoding scheme and the second control channel encoding scheme may be different. Thus, for example, the same RRC signal message may be used to transmit control channel information using a reliable encoding rate and the updated radio function learning model using a less reliable, but faster, encoding rate.

In an embodiment, the first portion of the radio resource control signal message may comprise one or more first control channel signal segments and the second portion of the radio resource control signal message comprises one or more second control channel signal segments. The radio resource control signal message may comprise a first radio resource format indication comprising one or more first segment identifiers corresponding, respectively, to the one or more first control channel signal segments. The radio resource control signal message comprises a second radio resource format indication comprising one or more second segment identifiers corresponding, respectively, to the one or more second control channel signal segments.

In an embodiment, the radio resource control signal message may comprise a first retransmission enablement indication to be indicative to the user equipment that requesting, by the user equipment, retransmission of at least one of the one or more first control channel signal segments is enabled. The radio resource control signal message may comprise a second retransmission enablement indication to be indicative to the user equipment that requesting, by the user equipment, retransmission of at least one of the one or more second control channel signal segments is enabled.

In another example, a method embodiment may comprise receiving, by a user equipment comprising a processor from a radio access network node, a control channel message comprising control channel information and artificial intelligence model information. The method may further comprise decoding, by the user equipment, the control channel information according to a first decoding format corresponding to a first encoding format to result in decoded control channel information and the method may further comprise decoding, by the user equipment, the artificial intelligence model information according to a second decoding format corresponding to a second encoding format to result in decoded artificial intelligence model information. The method may further comprise updating, by the user equipment, a trained artificial intelligence learning model based on the artificial intelligence model information to result in an updated trained artificial intelligence learning model. The method may comprise operating, by the user equipment, a radio function according to the updated trained artificial intelligence learning model. In an embodiment, the first encoding format may correspond to a first rate, the second encoding format may correspond to a second rate. In an embodiment, the first rate is lower than the second rate.

In an embodiment, the example method may further comprise operating, by the user equipment, according to the decoded control channel information before the decoding of the artificial intelligence model information according to the second decoding format.

In an embodiment, the control channel information and the artificial intelligence model information may be received from the radio access network node in a radio resource control signal message. The radio resource control signal message may comprise a radio resource control signal message format indication indicative of the first encoding format. The radio resource control signal message may comprise a first portion used to transmit the control channel information and a second portion used to transmit the artificial intelligence model information. The radio resource control signal message format indication may be indicative of at least one control channel signal segment used to transmit the control channel information in the first portion of the radio resource control signal message. The radio resource control signal message format indication may be indicative of retransmission, by the radio access network node, of at least one of the at least one control channel signal segment being enabled. The example method may further comprise determining, by the user equipment, that at least one of the at least one control channel signal segment was decoded with an error. The method may further comprise transmitting, by the user equipment to the radio access network node, a retransmission request message comprising a request for retransmission of the at least one of the at least one control channel signal segment that was decoded with the error. The method may further comprise receiving, by the user equipment, a retransmitted segment corresponding to the at least one of the at least one control channel signal segment that was decoded with the error and decoding, by the user equipment, the retransmitted segment according to the first decoding format to result in a decoded retransmitted segment. The retransmission request message may comprise at least one of: a process identifier corresponding to the first portion of the radio resource control signal message, or a segment identifier corresponding to the at least one of the at least one control channel signal segment was decoded with the error.

In an embodiment, the radio resource control signal message may comprise a radio resource control signal message format indication indicative of the second encoding format. The radio resource control signal message may comprise a first portion used to transmit the control channel information and a second portion used to transmit the artificial intelligence model information. The radio resource control signal message format indication may be indicative of at least one control channel signal segment used to transmit the trained artificial intelligence learning model in the second portion of the radio resource control signal message. The radio resource control signal message format indication may be indicative of retransmission, by the radio access network node of at least one of the at least one control channel signal segment, being enabled. The example method may further comprise determining, by the user equipment, that at least one of the at least one control channel signal segment was decoded with an error. The method may further comprise transmitting, by the user equipment to the radio access network node, a retransmission request message comprising a request for retransmission of the at least one of the at least one control channel signal segment that was decoded with the error the method may further comprise receiving, by the user equipment, a retransmitted segment corresponding to the at least one of the at least one control channel signal segment that was decoded with the error, and decoding the retransmitted segment according to the second decoding format to result in a decoded retransmitted segment. The retransmission request message may comprise at least one of: a process identifier corresponding to the second portion of the radio resource control signal message, or a segment identifier corresponding to the at least one of the at least one control channel signal segment that was decoded with the error. The method may further comprise operating, by the user equipment, according to the decoded control channel information before the decoding of the retransmitted segment according to the second decoding format.

In an embodiment, the radio resource control signal message may comprise a first portion used to transmit the control channel information and a second portion used to transmit the artificial intelligence model information, and the first portion may comprise a radio resource control signal message format indication indicative of the second portion.

In another example embodiment, a user equipment may comprise a processor configured to determine radio performance parameter metrics corresponding to operation of the user equipment with respect to a radio access network node to result in determined radio performance parameter metrics. The processor may be configured to transmit, to the radio access network node, the determined radio performance parameter metrics to be used to train a radio function artificial intelligence learning model to result in a trained radio function artificial intelligence learning model. The processor may be further configured to receive, from the radio access network node via a primary portion of a radio resource control signal message, control channel information corresponding to operation of the user equipment with respect to the radio access network node and to receive, from the radio access network node via a secondary portion of the radio resource control signal message, the trained radio function artificial intelligence learning model.

In an embodiment, the primary portion of the radio resource control signal message may be received according to a first decoding scheme corresponding to a first rate, the secondary portion may be received according to a second decoding scheme corresponding to a second rate. In an embodiment, the first rate may be lower than the second rate. Thus, the user equipment may adjust decoding of the RRC signal message to retrieve control channel information and then adjust decoding of the same RRC signal message to a different setup to retrieve the trained radio function artificial intelligence learning model.

In an embodiment, the radio resource control signal message may comprise a first radio resource format indication that may comprise one or more first segment identifiers indicative, respectively, of one or more first control channel signal segments used to transmit the control channel information via the primary portion of the radio resource control signal message. The radio resource control signal message may comprise a second radio resource format indication comprising one or more second segment identifiers indicative, respectively, of one or more second control channel signal segments used to transmit the radio function artificial intelligence learning model via the secondary portion of the radio resource control signal message.

The radio resource control signal message may comprise a retransmission enablement indication indicative of requesting retransmission, of the one or more first control channel signal segments or of the one or more second control channel signal segments, being enabled by, for example, the radio access network node.

In an embodiment, the processor is further configured to determine at least one of the one or more first control channel signal segments or one or more second control channel signal segments being received with an error to result in a determined erroneously received at least one segment. The processor may be further configured to transmit, to the radio access network node, a retransmission request message requesting retransmission of the determined erroneously received at least one segment.

In another example embodiment, a non-transitory machine-readable medium may comprising executable instructions that, when executed by a processor of a user equipment, facilitate performance of operations, comprising receiving, from a radio access network node via a first portion of a radio resource control signal message, control channel information and decoding the first portion of the radio resource control signal message according to a first decoding rate The operation may further comprise receiving, from the radio access network node via a second portion of the radio resource control signal message, an updated radio function learning model, wherein the updated radio function learning model comprises updated learning model information based on operation of at least one of a group of user equipment that comprises the user equipment. The operations may further comprise decoding the second portion of the radio resource control signal message according to a second decoding rate to result in a decoded updated radio function learning model. The operations may further comprise receiving, from the radio access network node, a first portion indication comprising a first set of one or more first segment identifiers indicative of a second set of corresponding one or more segments of the first portion of the radio resource control signal message, and receiving, from the radio access network node, a second portion indication comprising a third set of one or more second segment identifiers indicative of a fourth set of corresponding one or more segments of the second portion of the radio resource control signal message. In an embodiment, the first decoding rate and the second decoding rate are different.

In an embodiment, the operations may further comprise operating the user equipment according to the decoded updated radio function learning model.

In an embodiment, the radio resource control signal message may comprise a first retransmission enablement indication to be indicative to the user equipment that requesting, by the user equipment, retransmission a first segment of the first portion of the radio resource control signal message or retransmission of a second segment of the second portion of the radio resource control signal message is enabled. The operation may further comprise determining that the first segment of the first portion of the radio resource control signal message or that the second segment of the second portion of the radio resource control signal message comprises an error, or was received with an error, to result in a determined erroneous segment. The operations may further comprise transmitting, to the radio access network node, a retransmission request comprising a first segment identifier or a second segment identifier indicative of the determined erroneous segment, and responsive to the retransmission request, receiving, from the radio access network node, the first segment corresponding to the first segment identifier or the second segment corresponding to the second segment identifier indicated in the retransmission request.

BRIEF DESCRIPTION OF THE DRAWINGS

FIG. 5B illustrates an example radio resource control signal message comprising different segmented portions encoded and transmitted according to respectively different formats, comprising respective different format indications, with decoding of one portion prioritized over the other.

FIG. 8 illustrates a timing diagram of an example method to update, by a radio access network node, a learning model at a user equipment.

FIG. 9 illustrates a timing diagram of an example method to update, by a radio access network node via a control channel resource, a learning model with learning model update information received from a radio access network node via a control channel resource.

FIG. 10 illustrates a flow diagram of an example method to update an artificial intelligence learning model via a control plane resource.

FIG. 11 illustrates a block diagram of an example method.

FIG. 12 illustrates a block diagram of an example radio access network node.

FIG. 13 illustrates a block diagram of an example non-transitory machine-readable medium.

FIG. 14 illustrates a block diagram of an example method.

FIG. 15 illustrates a block diagram of an example user equipment.

FIG. 16 illustrates a block diagram of an example non-transitory machine-readable medium.

DETAILED DESCRIPTION OF THE DRAWINGS

Figure 1:
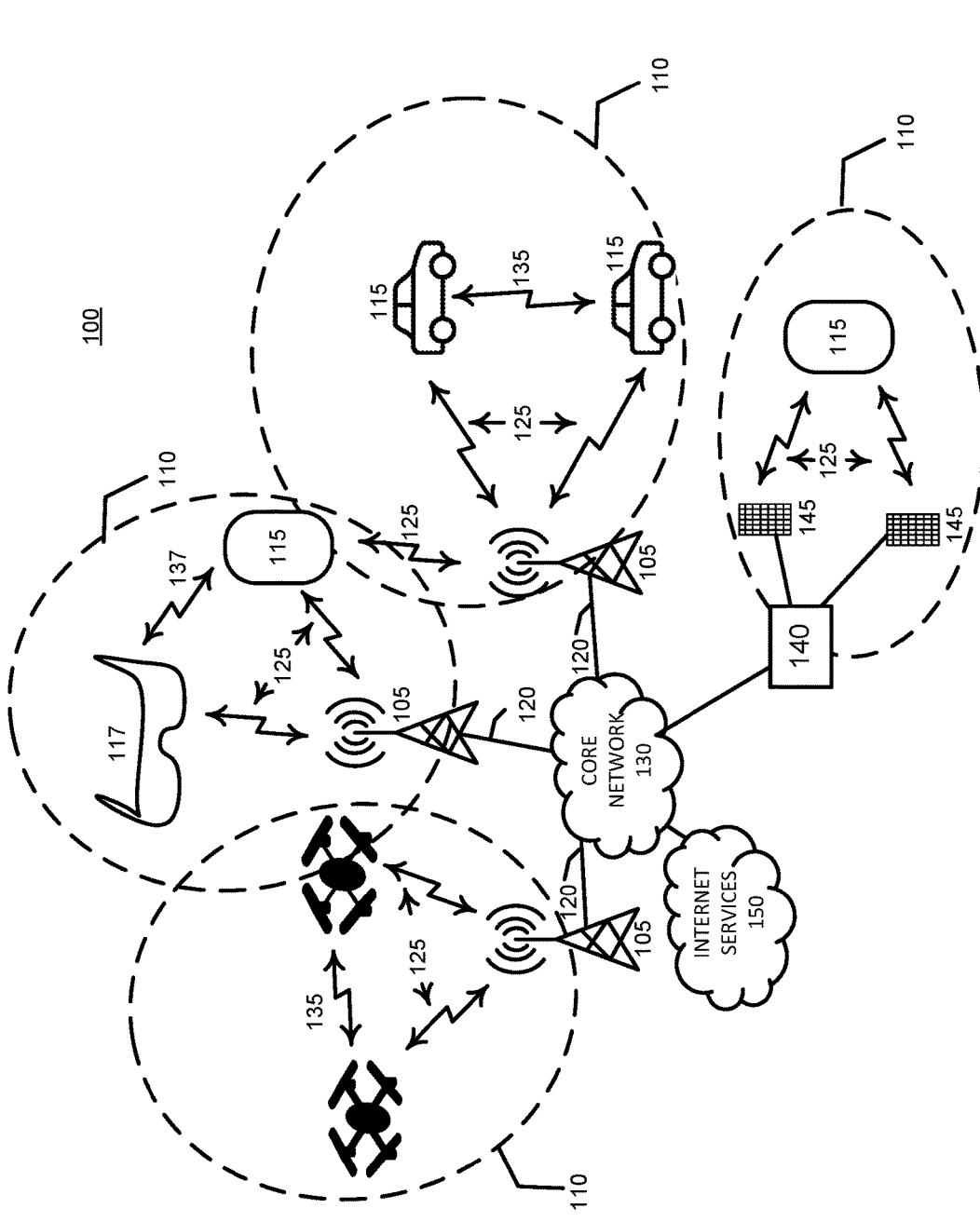
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions As disclosed herein, several embodiments facilitate dynamic management and updating of various AI/ML models deployed at different user equipment devices. A network RAN can dynamically control activation, deactivation, triggering of model retraining (that may be radio-function-specific) or updating of a learning model depending on monitoring and analysis of defined real-time performance metrics corresponding to a learning model being executed at a user equipment. It will be appreciated that even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTD). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHZ to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Conventional rules-based models may be implemented in user equipment to perform various radio frequency ("RF") functions or signal processing functions, such as, beamforming, channel estimation, demodulation, and decoding, and may be based on well-established system models. Such models may result in satisfactory performance as long as the models closely follow actual behavior of a radio network system in which the user equipment is/are operating. However, performance of conventional models may provide less than optimal performance. AI/ML-based models typically outperform their conventional counterparts; unlike conventional rules-based models, AI/ML-based models may be based on data rather than rules of a pre-determined conventional model. Thus, outputs, or outcomes, of conventional rules-based models may be deemed 'deterministic' because inputs are applied to static rules that result in a 'determined' output whereas outputs, or outcomes, of an AI/ML model may be viewed as probabilistic because, a learning model typically infers a probable output based on coefficients, factors, functions, or other variables that may have been arrived at based on previous inputs to the model.

Use of an AI/ML model may facilitate improved user equipment performance compared to use of a conventional rules-based model. Multiple AI/ML driven use cases may include: AI/ML channel state information ("CSI") acquisition/prediction, AI/ML radio positioning, and AI/ML beam management. Although an AI/ML-based model trained using data from actual, real-world operation, can potentially outperform a traditional rules-based model, a learning model may be less robust, and thus provide less desirable results, in situations where the radio system/environment may have undergone changes that may not have been experienced, or 'seen', during training of the learning model, and thus the learning model may infer less-than-undesirable outputs than a static rules-based model in such an situation that is 'unknown' to the learning model. This problematic situation may be caused by, for example, specific network/user equipment conditions or configurations, or by an architecture of an AI/ML learning model, or a combination thereof. Therefore, it is it is desirable to implement procedures such that a network RAN can update an AI/ML learning model.

For an AI/ML learning model implementation of a radio function at a user equipment, the user equipment or gNB/RAN may predict modulation and coding schemes ("MCS"), and a given amount of channel state information reporting instants may be used therefor. A modulation and coding scheme may be referred to as a format. A format, or scheme, may be associated with a Quality-of-service. A channel condition or an interference condition that did not exist during training or a model may systematically result a less-than-optimum MCS selection, which accordingly may lead to violating minimum device performance targets.

Training of an AI/ML model at a radio access network node and transmitting of a model, or a trained/updated model, by the RAN to a user equipment is desirable due to better processing capability at a RAN that at a UE to train or otherwise revise a learning model. Thus, AI/ML model transfer and delivery from a RAN to a UE via a radio link is desirable to take advantage of AI/ML processing-heavy model training being performed by a RAN separately from a UE that is actively running such model for performing radio functions based on the AI/ML model's inference. For example, an AI/ML model may be trained at a RAN node and transferred, or delivered, as a ready-trained model, towards user equipment devices over a downlink radio interface for executing AI/ML-driven beam failure detection and recovery operations. An AI/ML model size can range from small (e.g., one Kilobyte or less) to large (e.g., hundreds of Megabytes) depending on model complexity and purpose.

An artificial intelligence machine learning model may be delivered to a user equipment via a control channel or control channel resource, which may be a scheduled control channel resource. However, existing control channel signaling conventionally uses coding schemes or formats that are designed for carrying a small amount of control information a low coding rates that result in high reliability in delivering control channel information. Since convention control channel signal message tend to comprise small amount of information, slow rates associated with the low coding rates is an acceptable tradeoff for the high reliability that facilitates deliver of control channel information which a user equipment needs to operate. AI/ML model information may comprise large amount of information or data compared to a conventional control channel information message, and transmitting a AI/ML model, or a AI/ML model update according to a conventional control channel coding scheme, or format, can result in degraded spectral efficiency (e.g., a control channel resource carrying AI/ML model information may 'take over' a majority of bandwidth available for other uses and may result in starvation of resources that could otherwise be allocated or scheduled for data transmission). Other problems that may arise using control channel signal messages transmitted according to a conventional, highly reliable, control channel scheme may include increased control channel decoding latency, due to a large AI/ML model control payload as compared to typical control channel information sizes. The size of a AI/ML model may overwhelm capacity of control channels, thus 'crowding out' use of the control channel resources for vital, non-AI/ML, model control information.

Accordingly, embodiments disclosed herein may be applied at a RAN node or at a user equipment to facilitate novel transmission/encoding or novel receiving/decoding techniques, respectively, that may facilitate efficient delivery of large AI/ML model information via control channel resource. In a two-stage radio resource control ("RRC") signaling embodiment, a first RRC signal portion may carry non-AI vital control information and one or more second RRC signal portions may be dynamically scheduled and may transmit larger AI/ML model payload. Both RRC signal portions, despite being transmitted as parts of a single aggregate signal via the same RRC channel resource may be independently encoded and segmented at the RAN node according to different encoding schemes or format. Such an aggregated, or multi-stage, control channel signal message may facilitate a user equipment in independently decoding each of the control signal portions without the decoding, or a failing to decode, one portion impacting decoding performance of another portion. Thus, control channel reliability and latency performance are preserved for vital non-AI/ML control information even when a large amount of AI/ML model data is transmitted over the same control channel but in a different portion. Instead of delivery of control channel information becoming less reliable and taking more time to decode due to transmitting a large AI/ML model, or model update, by using a two-stage, or multi-stage, RRC signal message design as disclosed herein, with independent portion decoding and segmentation, a decoding error or an increased control channel decoding delay corresponding to decoding of an RRC control channel signal message portion carrying AI/ML model information does not propagate to an RRC control channel signal message portion carrying critical, non-AI/ML, control information.

In addition to two-stage, or multi-stage, control channel signal messages, embodiments disclosed herein facilitate RRC partial retransmission of an RRC control channel signal message. Unlike existing RRC procedures, where in case of a failed RRC signal decoding an entire RRC payload may retransmitted, embodiments disclosed herein facilitate partial RRC signal retransmission by configuring user equipment to report a part, or segment, of an RRC control channel signal message that has not been successfully received or decoded or to request retransmission of such an erroneously received part, or segment. Thus, for an RRC control channel signal message portion carrying AI/ML model segments that a user equipment failed to decode, only the segment that was not decoded may be retransmitted instead of the entire AI/ML model. Unlike existing semi-static RRC signaling update procedures, embodiments disclosed herein may comprise dynamic user equipment action and RRC signaling to facilitate decoding multi-portion, or multi-stage, RRC control signal messages.

Various existing control signaling procedures, including downlink control information ("DCI") signaling, and radio resource control signaling, are semi-static in the sense that control channel resources have been conventionally used to carry the smallest possible amount of control information to provide a user equipment with control information. A 5G control channel is small to maximize stringent latency and reliability requirements-without reliable and fast control channel transmitting, receiving, and decoding, acceptable performance of applications having stringent performance requirements, such as URLLC/XR use cases, may not be realized, fulfilled, or otherwise satisfied. Stringent control channel radio performance targets make conventional control channel signal messages capacity inefficient due to, for example, low coding rates than corresponding to high reliability (e.g., the lower the coding rate, the more likely a user equipment can decode a control channel signal message, even if a radio link with a RAN is subject to network congestion or interference). Accordingly, transmitting a small amount of control information, over a highly reliable and fast control channel, uses a large amount of resources (e.g., a large amount of bandwidth) relative to an amount of information conveyed by a control message.

Transferring or delivering AI/ML model information over radio control channels via control channel signaling from a radio access network node to user equipment devices may result in large AI/ML models usurping or overwhelming a networks overall radio resource capacity leaving much less available resources for useful data transmissions as may be needed to support certain applications. (Usurping by control channel messaging of resources that could otherwise be used to transmit data is also undesirable from a network operator's perspective since the operator may only be able to charge a customer for transfer of data and not for transfer of control channel information.) In addition, because control channels are fundamentally designed to carry as little information as possible, transmitting large AI/ML model information over existing control channels and the likely concomitant taking over of a large amount of available radio network frequency and timing resources typically leads to a degraded spectral efficiency with respect to usage of the radio resources. Another downside to using control channel messages to transmit AI/ML model information is that basic control information that is vital to operation of a user equipment can be blocked, or crowded out of being delivered, by large AI/ML model information blocks being transmitted over the same control channel signaling.

According to conventional operation of control signal messaging, a control channel message is discarded if not successfully decoded, and unlike data transmission operation, there are no provisions for control signal message retransmission or reception acknowledgment feedback for control channel signal messaging. Such lack of provision for control channel message retransmission is partly due to conventional control channels being conservative with respect to coding rates (e.g., conserve corresponding to low coding rate), highly reliable, and typically used to carry a small amount of control information. Because of the low coding rate and small message size, conventional control channel messages are typically decoded successfully, or if not, partial retransmission is not needed because a full control information payload transmitted again does not have a severe impact on network resource usage due to the small control information size.

However, with AI/ML model information, especially a large amount (e.g., Megabytes), being transmitted according to the same format as used to transmit vital non-AI related control signaling, delivery of conventional control channel information may be drastically degraded with respect to reliability and latency (transmitting larger information blocks takes much more reception and decoding time). Thus, for example, when a user equipment experiences poor RF conditions and the user equipment's configured control channel cannot be received successfully, the entire block of control signaling may be transmitted again, including both AI and non-AI related information if transmitted according to a conventional coding rate and format, thus extending delay before the user equipment is able to receive and decode vital control information. In handover scenarios (e.g., UE moving from being best served by coverage of a first RAN to being nest served by coverage of a second RAN), a UE may exhibit radio failure if non-AI related control information regarding handover is delayed due to the longer control signaling transmission delay caused by control channel transmission of payload corresponding to the AI model information.

Accordingly, embodiments disclosed herein separate existing vital control information from AI/ML model related information and applies different coding schemes, profiles, or formats to the different types of information even though the control information and AI/ML information may be contained in a single scheduled control channel message occasion or transport block. Embodiments disclosed herein facilitate efficiently transmitting AI/ML model information as part of RRC signaling without impacting radio performance or delivery corresponding to critical control channel information.

Figure 2:
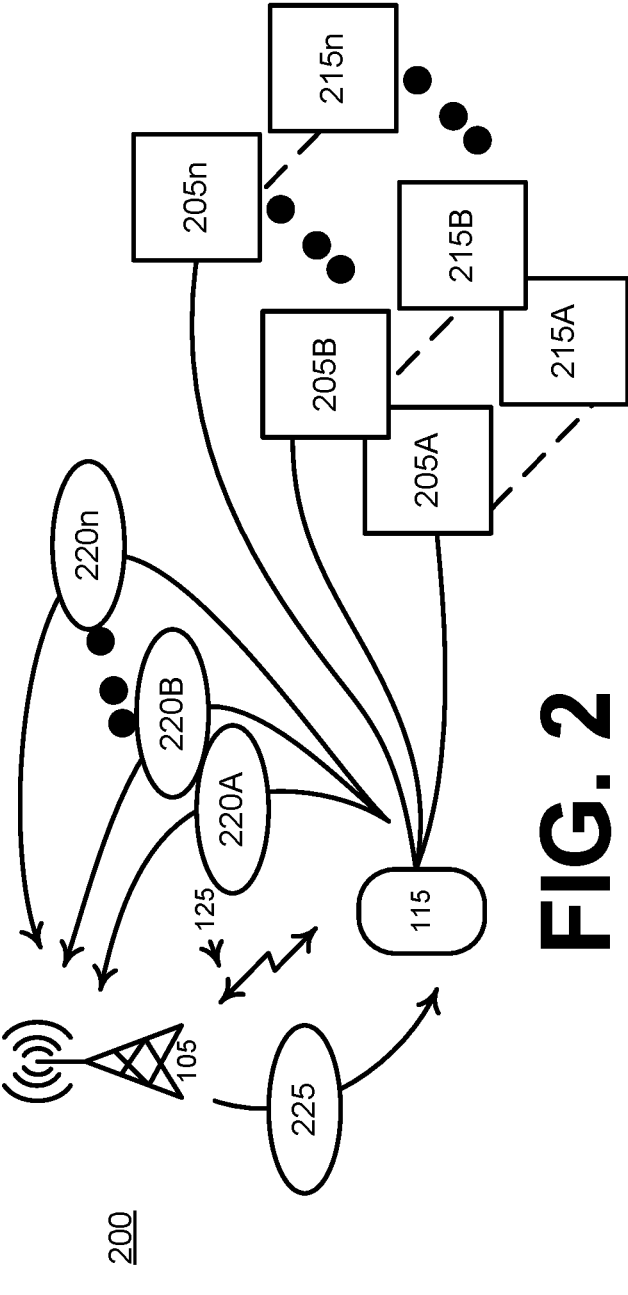
FIG. 2 illustrates an example environment with radio functions implemented in conjunction with corresponding learning models.

Turning now to FIG. 2, the figure illustrates a system 200 comprising a RAN node 105 in communication with a user equipment 115 via wireless link 125. UE 115 may perform various radio functions 205A-205n that may be facilitated by corresponding machine learning models 215A-215n, respectively. During UE 115 wireless operation and communication with RAN 105, the UE may transmit parameter metric reports 220A-220n that may comprise one or more learning model parameter metrics, corresponding to 215A-215n, respectively. Reports 220A-220n may comprise one or more control action requests, for example, requesting that one or more of models 215A-215n be deactivated, or retrained. RAN 105 may transmit to UE 115 a radio resource control message 225 corresponding to learning model information 215.

AI/ML learning models, such as models 215 shown in FIG. 2 deployed at UE device 115 may be implementation-specific, (e.g., vendor proprietary learning models). (Examples of vendors that may provide proprietary learning models may comprise user equipment manufacturers or providers of applications for user equipment, network equipment providers or providers of applications for network equipment, or mobile network operators or providers of applications for mobile network operators.) The network RAN may determine overall performance of learning models deployed at a UE to facilitate minimum device performance requirements. As disclosed herein, a dynamic reporting procedure may facilitate user equipment devices compiling and reporting indications, which may be configured, or preconfigured, that reflect, or indicate, model performance of corresponding learning models.

A particular user equipment device may adopt several different AI/ML learning model implementations for running, performing, or otherwise facilitating different radio functions. Different learning model parameter metrics may be indicative of performance of different learning models. A user equipment may compile and report one or more different learning model performance-indicating parameter metrics, or indications, per each learning model. Different learning model metrics may be associated with different respective filtering or time resolution configurations. Thus, such customized metric reporting for a given learning model may facilitate optimized tracking and reporting for each active learning model of each user equipment device 115 that may be served by a RAN 105, as shown in FIG. 1 or FIG. 2. Accordingly, a network RAN 105 can obtain and use real-time performance of each learning model active at a UE 115 to facilitate optimum performance of the learning model and inferences it may generate. Furthermore, several reporting variants may be tailored to suit various AI/ML learning model implementations or purposes, for example, exact absolute, exact relative, quantized, or temporal (e.g., historical) metric reporting. Network node RAN 105 may dynamically trade AI/ML learning model reporting overhead for accuracy in obtaining AI/ML model performance metrics.

For AI/ML learning model performance, various parameters, and metrics corresponding thereto, may be considered, analyzed, or evaluated depending on the nature of the problem being solved and corresponding learning model functionality (for example, regression or classification), or radio function being performed or facilitated by a learning model. For example, for a radio function such as channel estimation or channel state information ("CSI") compression, a regression function may be used in a learning model with the following parameters, or metrics corresponding thereto, potentially being evaluated: Mean squared error ("MSE"); Root mean squared error ("RMSE"); Normalized mean squared error ("NMSE"); Mean absolute error ("MAE"); R-squared; Generalized cosine similarity ("GCS"); or Squared generalized cosine similarity ("SGCS"). Table 1 shows example functions defining corresponding learning model parameters, metrics corresponding to which may be monitored and evaluated as listed above.

TABLE 1

| Learning Model Parameter | Definition |
| --- | --- |
| Mean squared error | $\frac{1}{N}\sum_{i=1}^{N}(y_i - \hat{y}_i)^2$ |
| Root mean squared error | $\sqrt{\frac{1}{N}\sum_{i=1}^{N}(y_i - \hat{y}_i)^2}$ |
| Normalized mean squared error | $\frac{1}{N}\sum_{i=1}^{N}\frac{(y_i - \hat{y}_i)^2}{y_i^2}$ |
| Mean absolute error | $\frac{1}{N}\sum_{i=1}^{N}|y_i - \hat{y}_i|$ |
| R-squared | $1 - \frac{\sum_{i=1}^{N}(y_i - \hat{y}_i)^2}{\sum_{i=1}^{N}(y_i - \bar{y})^2}$ |
| Generalized cosine similarity | $\frac{1}{N}\sum_{i=1}^{N}\frac{|y_i^H \hat{y}_i|}{\|y_i\|\|\hat{y}_i\|}$ |

TABLE 1-continued

| Learning Model Parameter | Definition |
| --- | --- |
| Squared generalized cosine similarity | $\frac{1}{N}\sum_{i=1}^{N}\frac{|y_i^H \hat{y}_i|^2}{\|y_i\|^2\|\hat{y}_i\|^2}$ |

For a classification problem such as beam index prediction, an accuracy parameter metric can be analyzed to determine performance of a learning model that is facilitating beam index predictions. Other example learning model parameter metrics that may indicate performance of learning models resolving a classification problem, may include, but are not limited to: absolute numbers of true negatives, true positives, false negatives, and false positives; Precision and recall; or an F1 score. An F1-score may comprise an evaluation metric, that is used to express the performance of a machine learning model, or classifier and provides combined information about the precision and recall of the learning model. A high F1-score metric typically indicates a high value for both recall and precision metrics.

AI/ML learning model implementations at different devices may be vendor-proprietary as described above, and may be transparent to network nodes (e.g., a RAN serving a UE may not have access to specific functions and programming of a given learning model deployed in the UE that facilitates radio functions). To manage and facilitate a UE device in achieving performance targets, the RAN node may be made aware of the UE device's capability and an overall AI/ML learning model performance. Therefore, active UE devices, upon first connecting to a serving network RAN, may transmit device-specific AI/ML capability information including the following information elements ("IE"s): Type of AI/ML supported algorithms including supervised learning, unsupervised learning, and reinforcement learning; List of AI/ML supported radio functions; List of supported AI/ML model-specific metrics to estimate and report; Model bank size of each radio function, e.g., number of models that can be stored for each radio function; or Indication of model categorization (small/medium/large), which may facilitate the network RAN in defining, or determining, a dataset to be used by a learning model. For example, for a large number of neurons (e.g., nodes of a learning model neural network), determination of a commensurate number of information samples may be used to avoid overfitting by the learning model. AI/ML capability information elements can be part of device capability signaling based on the subsequent radio resource control ("RRC") signaling or based on a dynamically scheduled uplink control information ("UCI") transmission. Accordingly, a network RAN may determine updates to one or more learning models and may deliver the updated models, or coefficients corresponding thereto, to user equipment.

Dynamic AI model delivery over radio control plane.

In an embodiment, a two-stage, or multi-stage (could be more than two stages), RRC signal message may comprise two or more stages, portions, parts, subsets, or other divisions, that are encoded and segmented independently, and therefore treated differently, depending on the content of each stage/portion. In an embodiment, segment-aware retransmission for only secondary RRC signal subsets, or portions, that carry AI/ML, or other data, may be implemented such that a RAN avoids transmitting an entire AI/ML model data again when a single segment, or fewer segments of a portion than the whole portion, is/are not successfully received by a user equipment.

At the network/RAN node side.

In an embodiment, a basic radio resource control signaling message may be transmitted as a two-stage message comprising a primary portion and a secondary portion. The primary RRC signaling portion may comprise conventional vital control information (e.g., for handover, random access, measurements, etc.) and may be encoded according to a primary format while the secondary RRC signaling portion may be encoded according to a secondary format and may comprise AI/ML model payload. It will be appreciated that data other than, or in addition to, AI/ML information may be transmitted in the secondary RRC signal message portion. In addition to a secondary portion, a RRC signal message may comprise a tertiary portion, or additional portions, that is/are encoded according to the secondary format, or according to different third, fourth, or so on, encoding and transmission formats. Large AI/ML model information may be separated from basic non-AI control information and can be treated differently depending on RF conditions corresponding to user equipment to receive the RRC signal message, or depending on size of AI/ML model information. To facilitate a user equipment receiving and decoding different portions of an RRC control signal message according to a different coding parameter or different other format parameters, a RAN may transmit a novel RRC format indicator as part of an RRC signal message that signals, or indicates to, receiving user equipment devices an RRC process identifier that is associated with either the primary or one or more secondary, tertiary, etc. RRC signal message portions. Based on information contained in a format indication, user equipment can adaptively receive and decode various AI and non-AI control information, using different radio configurations, from the same control signal message. For basic and small-sized control configurations of the primary RRC signal message format, there may be no need for retransmissions of segments corresponding to the primary portion in case of failed decoding. However, for large-sized AI/ML model information transmitted in a secondary RRC message portion, partial retransmission may be enabled, with the enabling being indicated via a format indication, to facilitate receiving the large AI/ML control information at a rate that may correspond to less reliability than a rate that may be used to transmit control information.

In an embodiment, when control information and AI/ML model information payload is segmented into multiple parts, (segmenting may be used to facilitate transmission of a large model size), retransmitting only segments which may have been lost or received by a user equipment with an error may enhance control channel capacity. Furthermore, due to the typically large size difference between existing control information and AI/ML model payload, different segmentation steps, or different segment sizes, may be used in embodiments disclosed herein. For example, control channel information in a primary RRC signal message portion may be transmitted using segments having a first size and AI/ML information may be transmitted using segments having a second size.

At the device side.

To prevent transmission of an AI/ML model payload an RRC signal from interfering with transmission to a UE of control information, independent segmentation and decoding may be supported at the UE so that a failed decoding of an RRC signal portion, or segment thereof, does not have significant effect on another portion of the RRC signal. Such independent transmission is not possible using single encoding and segmentation wherein a UE devices must receive all segments of an RRC signal message correctly to be able to decode the RRC signal. With a large AI/ML model data transmitted as part of an RRC signal message, it is likely that at least one segment will not be decoded successfully, which would render useless an entire received RRC information if conventional single encoding were to be used. Using embodiments herein, each of a primary and one or more secondary RRC signal portions may be independently segmented and encoded, thus facilitating a UE device in rapidly decoding vital non-AI control information of the primary RRC, when received in full, without having to wait to fully receive all segments corresponding to the much larger secondary RRC signal portion(s). Therefore, even when in poor RF conditions, where one or more segments of a secondary portion of an RRC message that are carrying AI/ML model information segments are not received without error, a user equipment device may nevertheless be able to receive and decode vital non-AI control information and avoid receiving of the control information being effectively blocked.

Embodiments disclosed herein may also facilitate UE devices requesting retransmitting of one or more segments of a secondary RRC signal message carrying AI/ML model if not decoded successfully, unlike existing RRC and general control channel procedures according to which if payload is not received successfully the entire RRC signal is transmitted again.

Figure 3:
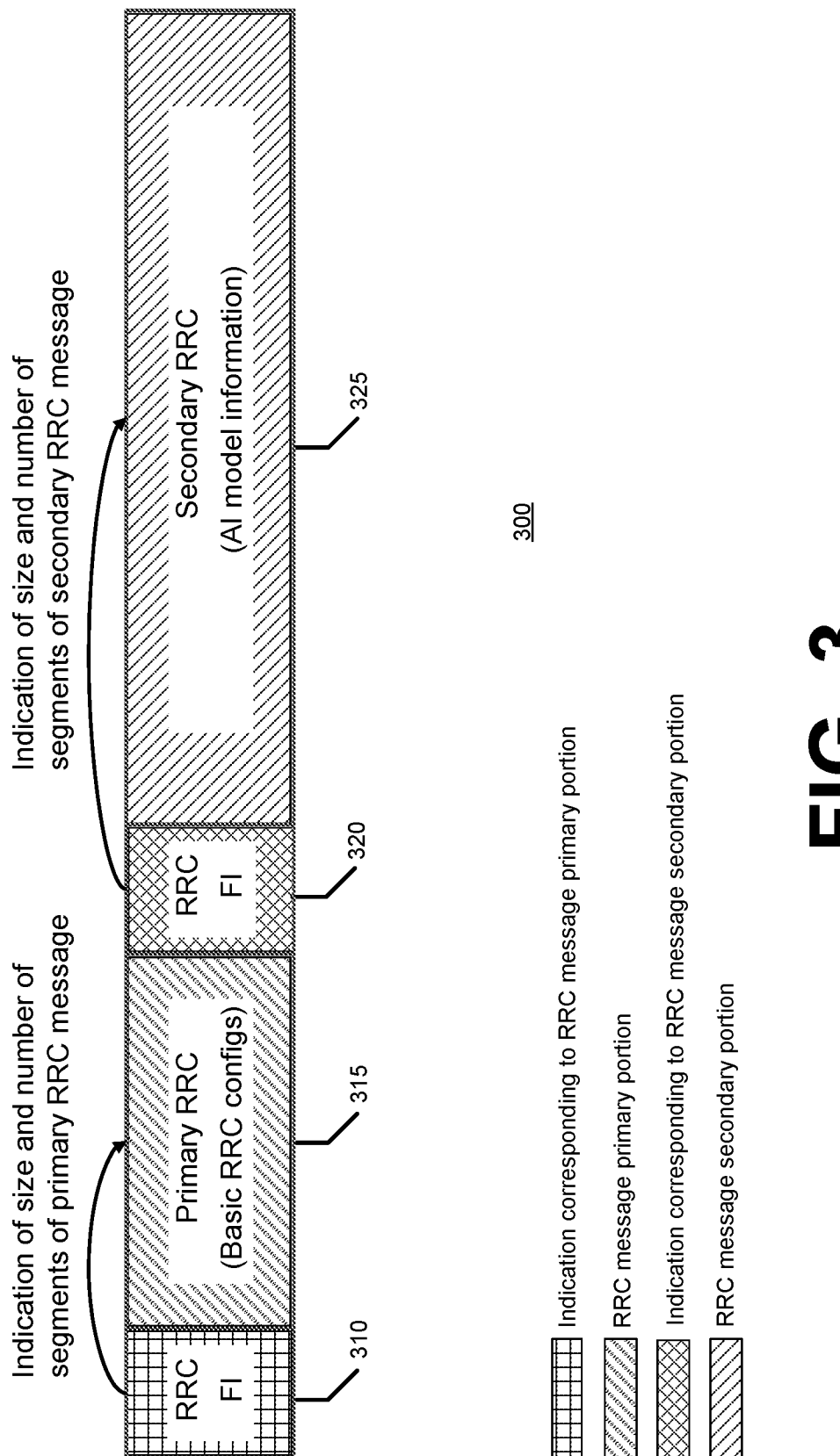
FIG. 3 illustrates an example radio resource control signal message comprising different portions encoded and transmitted according to respectively different formats.

As depicted by FIG. 3, a network/RAN node transmits radio resource control signal message signaling message 300 toward an AI/ML capable user equipment. Radio resource control signal message 300 is shown divided into two portions-primary RRC signal portion 315 and secondary RRC signal portion 325. Each of primary portion 315 secondary portion 325 may be encoded and segmented independently or differently from the other. RRC signal primary portion 315 and secondary portion 325 may comprise segments having segment numbers that are overlapped. (Overlapped meaning that segment numbers of secondary portion 325 may be the same as, or may be reset to start with the same number as, a beginning segment after the primary RRC segments have been received and decoded.) Furthermore, segment sizes of each RRC primary portion 315 and RRC secondary portion 325 can be different. In an embodiment, segments of a primary portion 315 or secondary portion 325 may be proportional to the to the total size of information being carried by the respective portion. A user equipment receiving RRC signal message 300 can attempt to decode primary portion 315 and secondary portion 325 independently, without a failure to decode one affecting decoding of the other.

To facilitate independent decoding, a RAN node that transmits RRC signal message 300 may add a new radio resource control signal message format indication 310 to RRC signal information. Radio resource control signal message format indication 310 may indicate to a user equipment an RRC process identifier, which may be indicative of primary portion 315 or secondary RRC signal portion 325. Primary format indication 310 may facilitate a user equipment in determining how to receive and decode subsequent, or secondary, portion 325. Format indication 310 may indicate a decoding rate to be used to decode portion 315. Format indication 310 may indicate format indication 320. Format indication 310 may indicate a number of segments and corresponding segment sizes of portion 315. Format indication 320 may indicate a number of segments and corresponding segment sizes of portion 325. In case of a user equipment failing to decode a segment, and in case RRC retransmission is enabled, the user equipment may determine a segment and RRC process identifier, in reference to indication 310 or indication 320, and report a specific retransmission request to a RAN node (in an example, a user equipment may request retransmission of a segment 2 of secondary RRC portion 325).

Figure 4A:
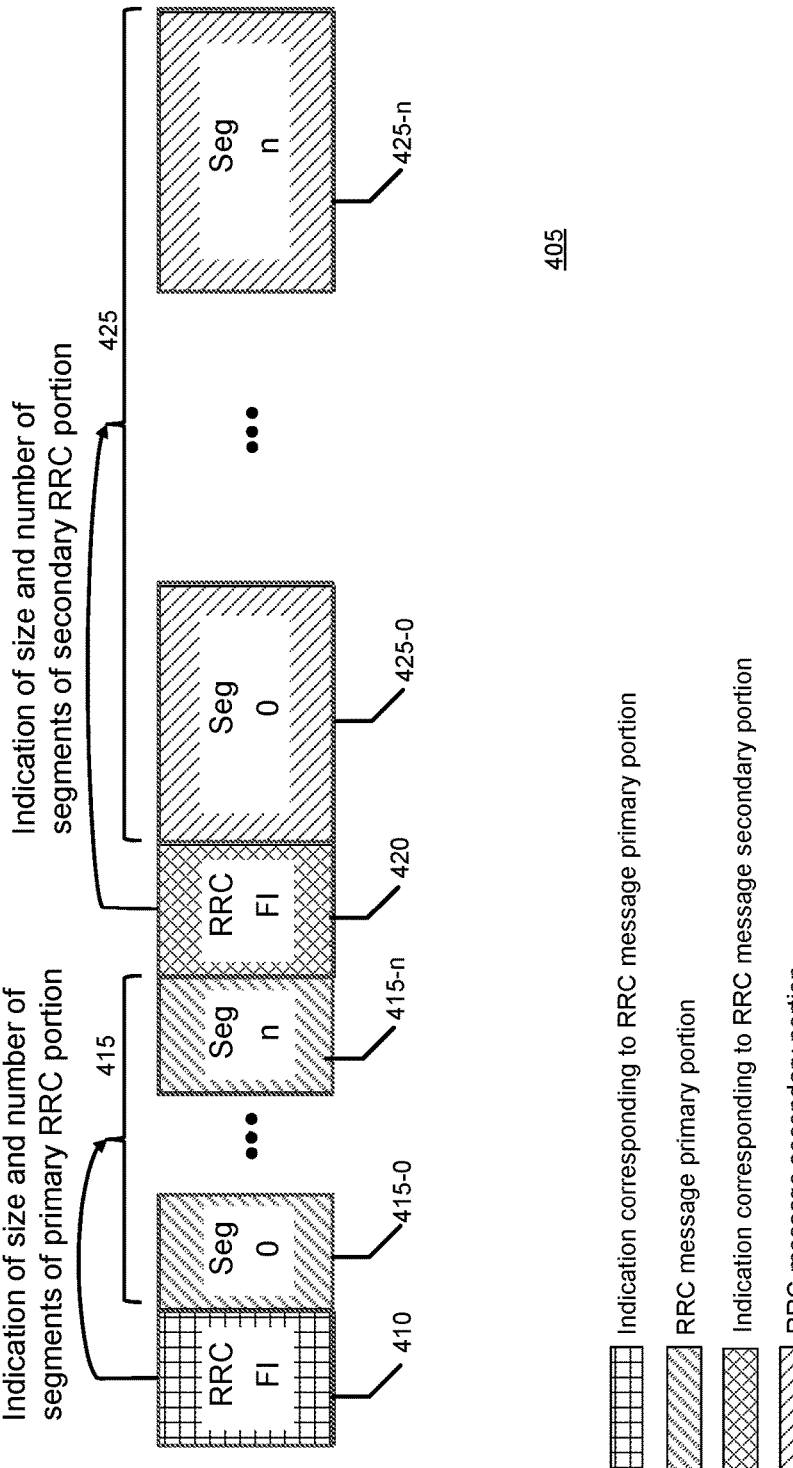
FIG. 4A illustrates an example radio resource control signal message comprising different portions encoded and transmitted according to respectively different formats, with each portion comprising multiple segments.

In an example embodiment, FIG. 4A illustrates independent segmentation of each of primary 415 and secondary RRC signal portion 425 of RRC signal message 405. Ability to implement such independent segmentation facilitates a RAN node in dynamically determining and configuring different segment sizes, and different numbers of segments 415-0 . . . 415-n or 425-0 . . . 425-n, of primary or secondary RRC signal portions 415 or 425, respectively. Thus, large AI/ML model information embedded in secondary portion 425 of RRC signal message 405 can be segmented with a larger segment size to reduce the number of segments while still preserving a reasonable AI/ML model reception reliability. Format indication 410 may indicate a number of segments 415-0 . . . 415-n and corresponding segment sizes of portion 415. Format indication 420 may indicate a number of segments 425-0 . . . 425-n and corresponding segment sizes of portion 425. Format indication 410 may indicate a decoding rate to be used to decode segments 415-0 . . . 415-n. Format indication 420 may indicate a decoding rate to be used to decode segments 425-0 . . . 425-n. Format indication 410 may indicate a rate and a resource to use for decoding indication 420. It will be appreciated that indicating a number of segments of primary portion 315 or secondary portion 325 via indications 310 or 320, respectively shown in FIG. 3, or indicating a number of segments of primary portion 415 or secondary portion 425 via indications 410 or 420, respectively shown in FIG. 4A, may facilitate a user equipment avoiding blind decoding of the primary or secondary portions.

Figure 4B:
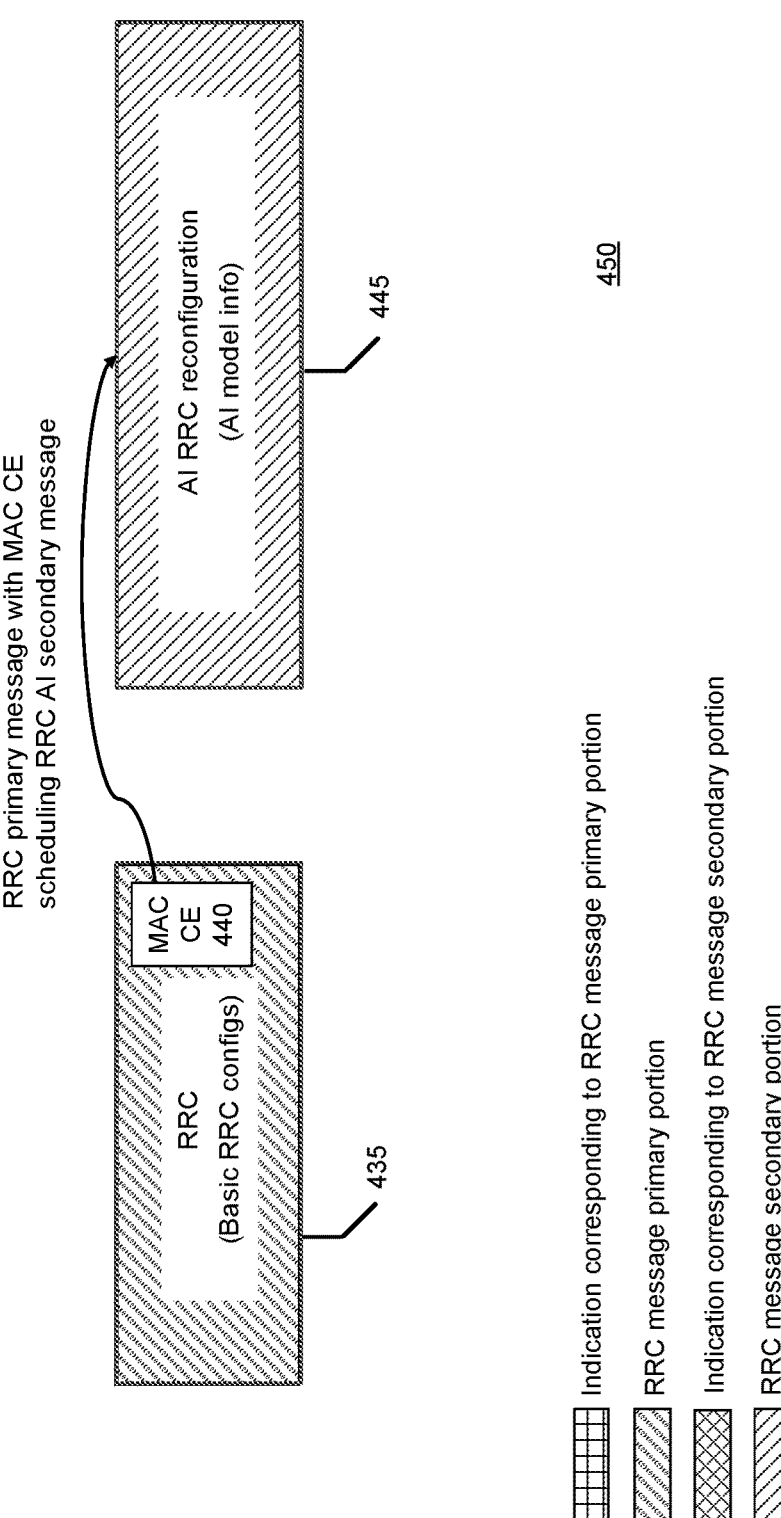
FIG. 4B illustrates an example radio resource control signal message comprising different portions, with one portion comprising an indication corresponding to the other.

In an example embodiment shown in FIG. 4B, a first RRC signal 435 may comprise conventional control channel information. RRC signal 435 may comprise indication 440 to be indicative of second RRC signal 445. Indication 440 may comprise a medium access control ("MAC") control element ("CE") to be used to configure and schedule a user equipment to receive and decode second RRC signal 445, which may comprise large AI/ML model information. An advantage of the embodiment shown in FIG. 4B is less deviation from conventional standardized procedures. Adding a standard MAC CE as indication 440 inside RRC signal 435 configured and transmitted according to existing RRC signaling facilitates decoding of both first signal 435 and second signal 445 according to a format configured for RRC signaling without using format indications, such as format indication 410 or format indication 420 shown in, and described in reference to, FIG. 4A, for example. The embodiment shown in FIG. 4B may be suitable to use with user equipment that report a reasonably satisfactorily-received signal strength/coverage from a serving RAN/cell such that a probability of decoding first RRC signal 435 is high. As an example, in case first RRC signal 435 shown in FIG. 4B is not successfully received or decoded by a user equipment, the user equipment will not be able to identify that there is a second RRC signal 445 scheduled for carrying AI/ML model information. Thus, the embodiment shown in FIG. 4B, while not using novel format indications corresponding to multiple portions and thus imposing less deviation from current radio access network deployments, may not be suitable when signal strength at a user equipment is poor.

Figure 5A:
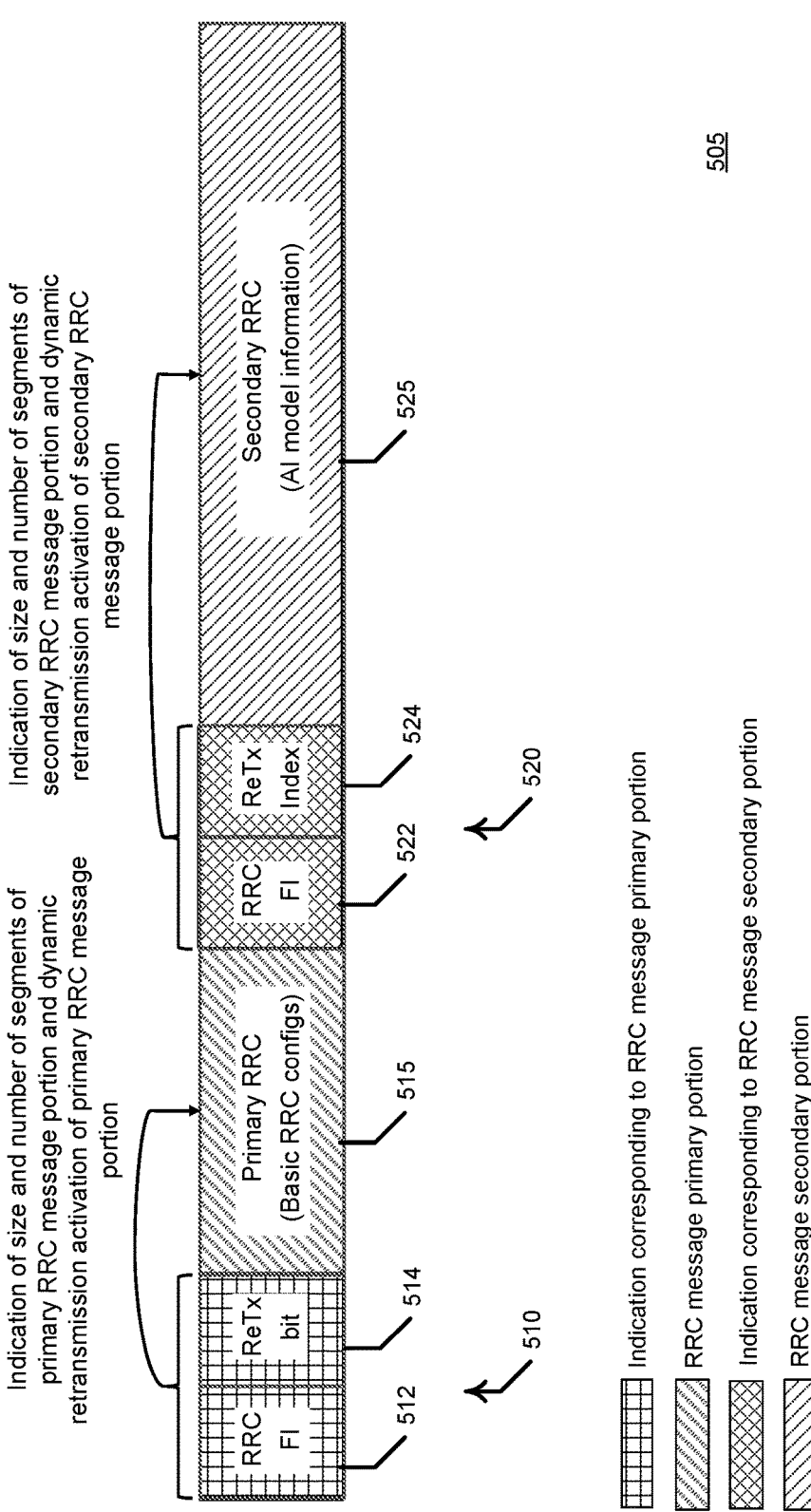
FIG. 5A illustrates an example radio resource control signal message comprising different portions encoded and transmitted according to respectively different formats, and comprising respective different format indications that comprise retransmission enablement indications.

Turning now to FIG. 5A, as discussed earlier, control signaling conventionally does not support retransmission, due to the small sized control information and high reliability associated with transmitting control information. However, with AI/ML model information being transmitted via control channel resources, control channel partial retransmission may be beneficial. Therefore, as depicted by embodiment 505 FIG. 5A, as part of multi-stage RRC signaling embodiments disclosed herein, a RAN node may add retransmission request indication 514. Retransmission indication 514 may comprise a bit, or bits, being added to format indication 512, which is indicative of a format corresponding to primary portion 515. Similarly, a RAN node may add retransmission request indication bit, or bits, 524 to format indication 522, which may correspond to one or more segments of secondary portion 525.

A RAN node may selectively activate control information retransmission for an RRC signal part, or portion, while using a conventional control channel transmission configuration (e.g., no support for control channel retransmission) for another RRC part, or portion. For example, if a secondary RRC signal portion comprises a large AI/ML model, a user equipment may not decode the secondary RRC signal portion if a single segment is dropped or not successfully decoded. Transmitting the full secondary RRC portion 525, carrying an entire AI/ML model, may be inefficient. Thus, retransmission being enabled may facilitate user equipment devices reporting only a segment identifier, or identifiers, corresponding to a segment, or segments, secondary RRC signal portion to be retransmitted.

Figure 5C:
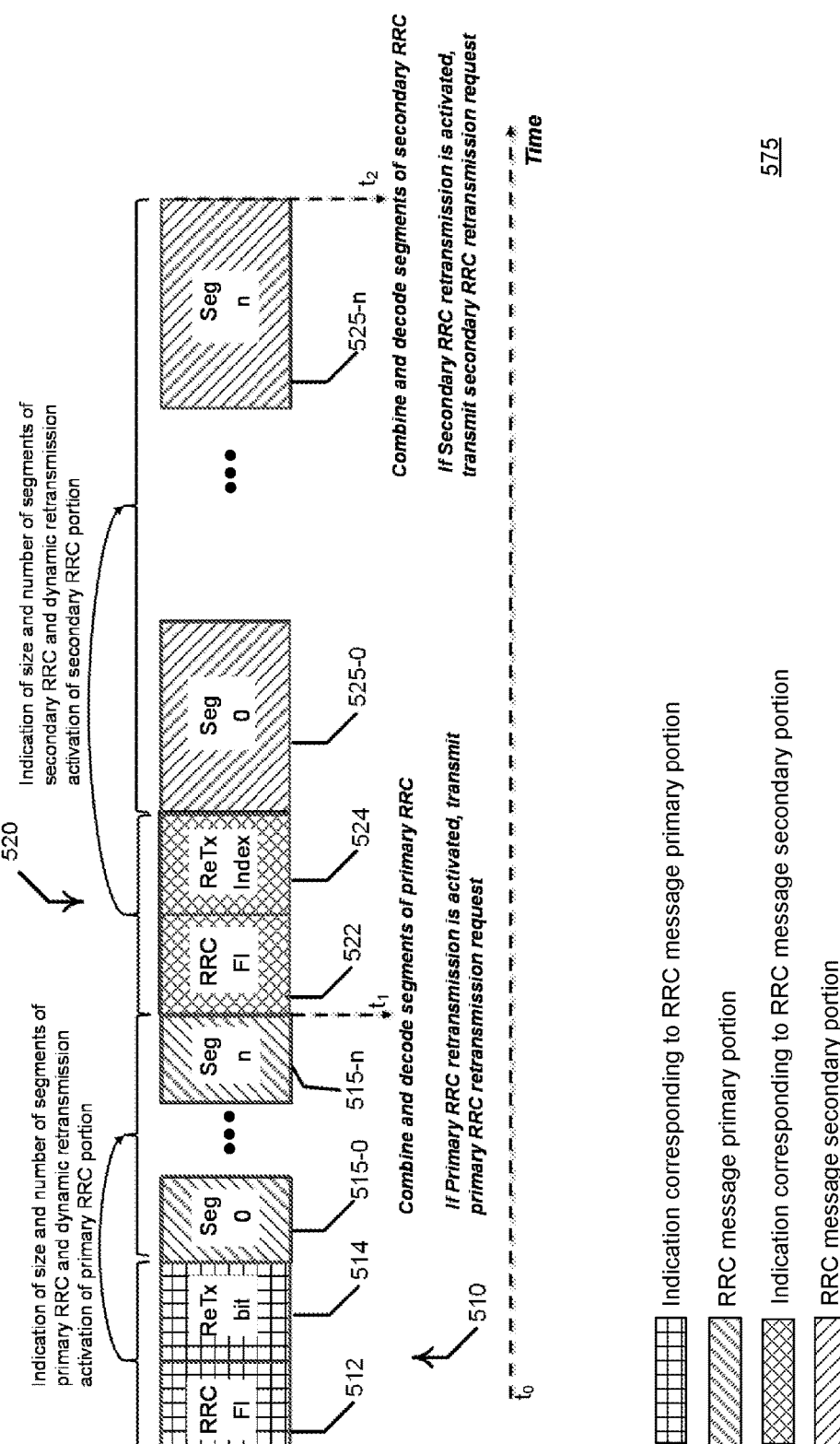
FIG. 5C illustrates an example radio resource control signal message comprising different segmented portions encoded and transmitted according to respectively different formats, comprising respective different format indications, with decoding of one portion prioritized over the other, that comprise retransmission enablement indications.

As shown in FIGS. 5B and 5C, example embodiments 545 and 575, respectively, may facilitate user equipment decoding and reporting partial reception status of RRC control channels. As depicted in FIG. 5B, independent encoding and segmenting of RRC message primary portion 515 and RRC message secondary portion 525 may facilitate a user equipment decoding each RRC signal portion independently based on information contained in format indications 512 or 522, respectively. Thus, a failed decoding of one RRC signal portion may not negatively impact decoding performance of another RRC signal portion. For example, if a user equipment successfully decodes control information contained in portion 515 according to format information indicated by indication 5512 to be used for decoding segments 515-0 . . . 515-n, the user equipment can continue to function using control information contained in portion 515 while decoding segments 525-0 . . . 525-n of portion 525 According to a format indicated in indication 522. Furthermore, blocking, or increased reception latency problems, of decoding of vital, non-AI, control information, due to decoding of control information being overwhelmed by a larger AI model payload is avoided.

As shown in FIG. 5C, an RRC segment-aware retransmission embodiment 575 is shown. A user equipment can determine and transmit separate and independent control channel retransmission requests for each RRC signal primary portion 510 and RRC signal secondary portion 520, depending on whether retransmission is enabled for either part or depending on decoding condition(s) corresponding to a portion for which transmission may have not been completes successfully. Thus, a user equipment may receive vital, non-AI, control information via retransmission based on retransmission indication 514 without waiting for decoding, or retransmission and decoding, of information contained in secondary portion 520. A user equipment may transmit an RRC retransmission requests requesting retransmission of RRC signal primary portion segments 515-0 . . . 515-n while still receiving a large secondary RRC signal portion 525, thus facilitating operating according to control information contained in primary portion 510 without waiting to receive and decode secondary portion 520.

Figure 6:
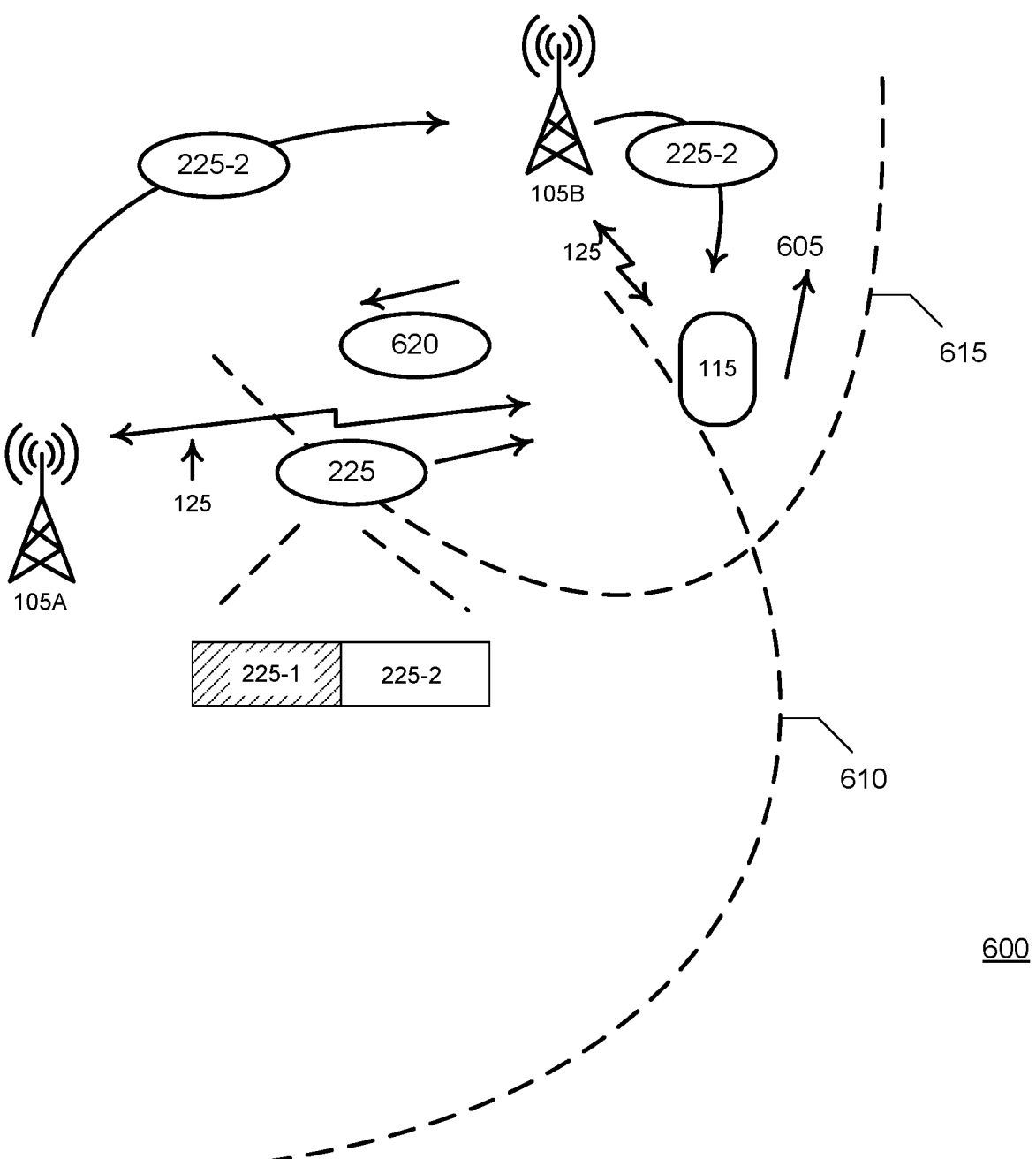
FIG. 6 illustrates an example environment with a user equipment a learning model update while moving from coverage of one radio access network to another.

FIG. 6 illustrates environment 600 in which UE 115 is moving in direction 605 out of coverage area 610 corresponding to RAN 105A and into coverage area 615 corresponding to RAN 105B while receiving updated AI.ML information 225. As shown, a first segment 225-1, as indicated by the shaded block of AI/ML model information 225, has been delivered to UE 115 before the UE moved outside of range 610. UE 115 may transmit a retransmission request 620 to RAN 105A requesting retransmission of unreceived segment 225-2. Accordingly, because UE 115 has been handed off from being served by RAN 105A to being served by RAN 105B, responsive to receiving request 620, RAN 105A may transmit to RAN 105B, via a backhaul link, segment 225-2. RAN 105B may then transmit, via a wireless radio link 125, segment 225-2 to UE 115, which is better served by RAN 105B than 105A (e.g., stronger signal received from RAN 105B than RAN 105A).

Figure 7:
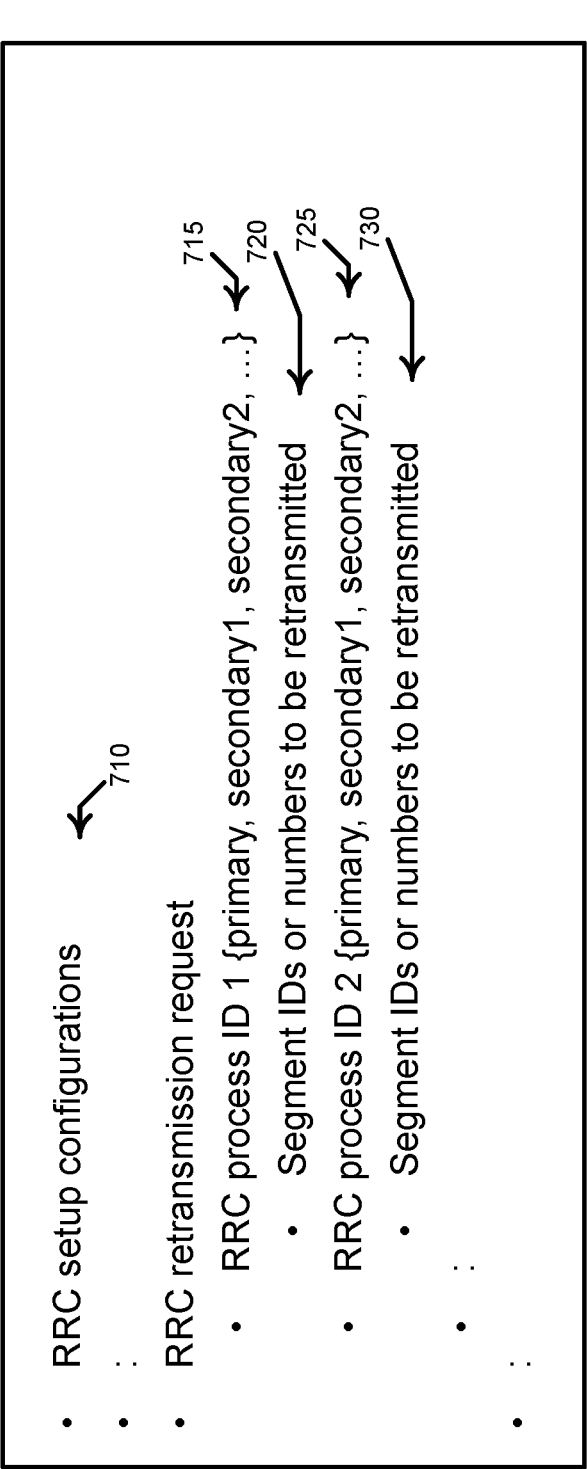
FIG. 7 illustrates an example radio resource segment retransmission request.

Turning now to FIG. 7, the figure illustrates an example RRC retransmission request 700 transmitted by an AI/ML capable user equipment toward a serving RAN node. On condition of a failed decoding of a primary or secondary RRC segment, a user equipment may transmit retransmission request 700 that may comprise: An RRC primary process identifier 715 indicative of an RRC signal primary portion; an RRC segment identifier 720 indicative of a segment, corresponding to a primary portion indicated by identifier 715, to be retransmitted; an RRC secondary process identifier 725 indicative of an RRC signal secondary portion; or an RRC segment identifier 730 indicative of a segment, corresponding to a secondary portion indicated by identifier 725, to be retransmitted.

Turning now to FIG. 8, the figure illustrates a timing diagram of an example method 800. At act 805, a RAN node 105 may receive from a core network, such as core network 130 shown in FIG. 1, a coverage threshold and a maximum allowable time period for transmitting radio resource control (RRC) signaling carrying AI model information. On condition of receiving a coverage level report, transmitted by WTRU/UE 115 at act 810, indicating that coverage at the WTRU/UE satisfies the configured coverage threshold within the indicated period, RAN node 105 transmits at act 815 AI model information as part of RRC reconfiguration signaling.

If, however, RAN node 105 receives a coverage level report from WTRU/UE 115 that indicates violation of the configured coverage threshold within the indicated time period, or that indicates satisfaction of the configured coverage threshold but not within the configured time period, RAN node 105 may segment the RRC message using two independent segment processes, one being used for a primary RRC signal portion and another being used for AI model delivery via a secondary RRN signal portion. At act 825, RAN 105 may generate a multi-bit segment-aware RRC reconfiguration format indication indicative of RRC segment process identifiers, and may transmit the format indication with an RRC reconfiguration signal at act 830. At act 835, on condition of detecting, or receiving from WTRU/UE 115, a link failure indication or coverage level report triggering inter-RAN node handover, RAN 105 may prioritize, with respect to transmission of the secondary AI model RRC process, re-transmitting (via radio interface) or forwarding (via backhaul links) remaining RRC segments corresponding to the primary RRC process identifier transmitted at act 830. At act 840, RAN node 105 may re-transmit (via radio interface links) or forward (via backhaul links) to another RAN remaining, or not yet transmitted, RRC segments corresponding to the primary RRC process indicated at act 830 (e.g., segments that were not successfully transmitted to, or successfully received by, WTRU/UE 115 before receiving a link failure or poor coverage report at act 835). On condition of completing re-transmission (via radio interface) or forwarding (via backhaul links) of remaining RRC reconfiguration segments corresponding to the primary RRC process indicated at act 830, at act 845 RAN node 105 may transmit to the other RAN node (via radio interface) or forward (via backhaul links) remaining RRC reconfiguration segments corresponding to the secondary RRC process (e.g., segment comprising an AI/ML model) to be transmitted to WTRU/UE 115 by the other RAN node.

Turning now to FIG. 9, the figure illustrates a timing diagram of a method 900. At act 905, AI-capable WTRU/UE 115 may receive and decode RRC reconfiguration signaling, from serving RAN node 105. The RRC signaling may comprise one or more format indications and one or more RRC segment-aware retransmission enabled indications. At act 910, WTRU/UE 115 may determine the signaled RRC format indication received at act 905. On condition of receiving an RRC signal primary portion format indication, WTRU/UE 115 may receive, at act 915, RRC signaling segments corresponding to the indicated primary RRC process/portion. At act 920, WTRU/UE 115 may combine and decode RRC segments indicated in a format indication as corresponding to the primary RRC process portion. UE 115 may combine/aggregate received segments corresponding to a primary process/portion or a secondary process/portion for decoding the process/portion and the user equipment may decode the process/portion if the user equipment receives all segments corresponding to the process/portion. In the context of RRC segment retransmission, UE 115 may fail to receive one or more segments corresponding to the primary process/portion or the secondary process/portion. UE 115 may transmit to RAN 105 a negative acknowledgement indicating segments that were not decoded correctly. However, UE 115 may not 'throw away' the received failed segments because a segment that was not decoded correctly may still comprise useful information energy even though the segment could not be decoded correctly. Thus, UE 115 may combine, or superimpose, a failed first transmission of a segment with a second or further additional retransmission of the segment so that different transmissions of the same segment add energy to each other to enhancing decoding ability due to the combining gain.

On condition of a failed decoding of an RRC segment corresponding the indicated primary RRC process portion, and on condition of having received an RRC primary portion retransmission-enabled indication, at act 925, WTRU/UE 115 may transmit an RRC segment re-transmission request to RAN 105, indicating a primary RRC process identifier and a segment identifier indicative of a primary portion segment to be re-transmitted. At act 930, on condition of AI model delivery using a secondary RRC process portion being indicated by a format indication, WTRU/UE 115 may receive RRC signaling segments, corresponding to the secondary RRC portion. At act 935, WTRU/UE 115 may combine and decode RRC segments corresponding to the secondary RRC portion. On condition of a failed decoding of an RRC segment corresponding to the secondary RRC process and on condition of having received an RRC secondary portion retransmission indication, WTRU/UE 115 may transmit, at act 940, an RRC segment re-transmission request, indicating a secondary RRC process identifier and a segment identifier corresponding to one or more secondary portion segment(s) to be re-transmitted.

Turning now to FIG. 10, the figure illustrates a flow diagram of an example method 1000. Method 1000 begins at act 1005. At act 1010, a radio access network node may receive control channel transfer configuration information from a core network, for example core network 130 shown in FIG. 1. At act 1015 shown in FIG. 10, a user equipment may transmit a coverage report to the radio access network node reporting a coverage, or a signal strength, corresponding to the radio access network node and measured by the user equipment. The configuration received at act 1010 may comprise a coverage criterion, or a coverage threshold. If a signal strength reported by the user equipment at act 1015 satisfies the coverage, or signal strength, criterion, for example if the reported signal strength is greater than a criterion threshold, method 1000 advances to act 1025 and may transmit artificial intelligence machine learning information in a control channel resource using a reliable encoding rate before advancing to act 1080 and ending.

Returning to description at act 1020, if a criterion received in the configuration at act 1010 is not satisfied, method 1000 advances to act 1030. At act 1030, the radio access network node may transmit control information in a primary portion of a radio resource control signal message encoded at a first rate and artificial intelligence machine learning information in a secondary portion of the radio resource control signal message encoded at a second rate. At act 1035, the user equipment may receive the radio resource control signal message having the primary and secondary portions. The radio resource control signal message may comprise one or more format indications, that may indicate primary and secondary formats that may be applied to receiving and decoding the primary and secondary portions of the radio resource control signal message, respectively.

At act 1040 the user equipment may decode, or attempt decoding, of control information received in the radio resource control signal message transmitted at act 1030, according to a coding rate, or decoding rate, indicated in the primary format indication described in reference 1035. At act 1045, the user equipment may determine whether the control information decoded at act 1040 was decoded successfully. If the control information was decoded successfully, method 1000 advances to act 1050. At act 1050, the user equipment may decode, or attempt to decode, artificial intelligence machine learning information according to a second coding rate, or second decoding rate, indicated by the secondary format indication received in the RC signal message at 1035. At act 1055, the user equipment may determine whether the artificial intelligence machine learning information was decoded successfully. If the artificial intelligence machine learning information was decoded successfully, method 1000 advances to act 1080 and ends.

Returning to description of act 1045, if a determination is made that control information was not decoded successfully, method 1000 advances to act 1060. At act 1060, the user equipment may request retransmission of one or more segments of the primary portion of the radio resource control signal message received at act 1035 according to a retransmission indication that may be part of the radio resource control signal message received at that 1035. At act 1065, the radio access network node may receive the retransmission request transmitted it at 1060, and may determine whether the user equipment is moving, for example moving out of coverage corresponding to the radio access network node and into coverage of a different radio access network node that may provide better communication services to the user equipment. The radio access network node may determine at act 1065 that the user equipment is moving and method 1000 advances to act 1070.

At act 1070 radio access network node may receive an indication from the user equipment of a yet-to-be received or yet-to-be decoded segment of either the primary portion or secondary portion of the radio resource control signal message received at 1035, and the RAN may transmit the yet-to-be received/decoded portion via a wireless radio link, or a backhaul link, to the different radio access network node that may provide better communication service to the user equipment. If the radio access network node has transmitted yet-to-be received (by the user equipment) portion of the radio resource control signal message received at act 1035 to the different radio access network node, the different, or new, radio access network node becomes the serving radio access network node serving the user equipment and may transmit the yet-to-be received primary portion or secondary portion of the radio resource signal message at act 1030 and method 1000 continues with respect to the retransmission as previously described.

Returning to description of act 1065, if a determination is made that the user equipment is not moving out of coverage of the radio access node into better coverage corresponding to a different radio access network node, the radio access node returns to act 1030 and transmits again the yet-to-be received segment, or segments, of the primary portion or secondary portion of the radio resource control signal message previously transmitted at act 1030.

Returning to description of act 1055, if the user equipment determines that the artificial intelligence machine learning information decoded at act 1050 was not completely decoded, or was not successfully decoded without error, method 1000 advances to act 1075 and the user equipment requests retransmission of one or more segments corresponding to the artificial intelligence machine learning information that was not received or correctly decoded. Method 1000 advances from act 1075 to act 1065 and continues as previously described.

Turning now to FIG. 11, the figure illustrates an example embodiment method 1100 comprising at block 1105 transmitting, by a radio access network node comprising a processor to a user equipment according to a first encoding format, control channel information corresponding to a communication session between the radio access network node and the user equipment; at block 1110 transmitting, by the radio access network node to the user equipment according to a second encoding format, artificial intelligence model information; at block 1115 wherein the first encoding format and the second encoding format are different; at block 1120 wherein the control channel information and the artificial intelligence model information are transmitted in a radio resource control signal message; and at block 1125 wherein the control channel information is transmitted via a primary portion of the radio resource control signal message, and wherein the artificial intelligence model information is transmitted via at least a secondary portion of the radio resource control signal message.

Turning now to FIG. 12, the figure illustrates a radio access network node 1200, comprising at block 1205 a processor configured to: train a radio function artificial intelligence learning model to result in a trained radio function artificial intelligence learning model; a block 1210 transmit, to a user equipment, control channel information corresponding to a communication session between the radio access network node and a user equipment via a primary portion of a radio resource control signal message;

and at block 1215 transmit, to the user equipment, the trained radio function artificial intelligence learning model via a secondary portion of the radio resource control signal message.

Turning now to FIG. 13, the figure illustrates a non-transitory machine-readable medium 1300 comprising at block 1305 executable instructions that, when executed by a processor of a radio access network node, facilitate performance of operations, comprising: receiving, from at least one user equipment, at least one radio performance metric corresponding to at least one radio performance parameter; at block 1310 training a radio function learning model with the at least one radio performance metric to result in an updated radio function learning model to be used by the at least one user equipment; at block 1315 transmitting, to the at least one user equipment via a first portion of a radio resource control signal message according to a first control channel encoding scheme, control channel information; at block 1320 transmitting, to the at least one user equipment via a second portion of the radio resource control signal message according to a second control channel encoding scheme, the updated radio function learning model; and at block 1325 wherein the first control channel encoding scheme and the second control channel encoding scheme are different.

Turning now to FIG. 14, the figure illustrates an example embodiment method 1400 comprising at block 1405 receiving, by a user equipment comprising a processor from a radio access network node, a control channel message comprising control channel information and artificial intelligence model information; at block 1410 decoding, by the user equipment, the control channel information according to a first decoding format corresponding to a first encoding format to result in decoded control channel information; at block 1415 decoding, by the user equipment, the artificial intelligence model information according to a second decoding format corresponding to a second encoding format to result in decoded artificial intelligence model information; at block 1420 updating, by the user equipment, a trained artificial intelligence learning model based on the artificial intelligence model information to result in an updated trained artificial intelligence learning model; at block 1425 operating, by the user equipment, a radio function according to the updated trained artificial intelligence learning model; and at block 1430 wherein the control channel information and the artificial intelligence model information are received from the radio access network node in a radio resource control signal message.

Turning now to FIG. 15, the figure illustrates an example user equipment 1500, comprising at block 1505 a processor configured to: determine radio performance parameter metrics corresponding to operation of the user equipment with respect to a radio access network node to result in determined radio performance parameter metrics; at block 1510 transmit, to the radio access network node, the determined radio performance parameter metrics to be used to train a radio function artificial intelligence learning model to result in a trained radio function artificial intelligence learning model; at block 1515 receive, from the radio access network node via a primary portion of a radio resource control signal message, control channel information corresponding to operation of the user equipment with respect to the radio access network node; at block 1520 receive, from the radio access network node via a secondary portion of the radio resource control signal message, the trained radio function artificial intelligence learning model; and at block 1525 wherein the primary portion of the radio resource control signal message is received according to a first decoding scheme corresponding to a first rate, wherein the secondary portion is received according to a second decoding scheme corresponding to a second rate, and wherein the first rate is lower than the second rate.

Turning now to FIG. 16, the figure illustrates a non-transitory machine-readable medium 1600 comprising at block 1605 executable instructions that, when executed by a processor of a user equipment, facilitate performance of operations, comprising: receiving, from a radio access network node via a first portion of a radio resource control signal message, control channel information; at block 1610 decoding the first portion of the radio resource control signal message according to a first decoding rate; at block 1615 receiving, from the radio access network node via a second portion of the radio resource control signal message, an updated radio function learning model, wherein the updated radio function learning model comprises updated learning model information based on operation of at least one of a group of user equipment that comprises the user equipment; at block 1620 decoding the second portion of the radio resource control signal message according to a second decoding rate to result in a decoded updated radio function learning model; at block 1625 receiving, from the radio access network node, a first portion indication comprising a first set of one or more first segment identifiers indicative of a second set of corresponding one or more segments of the first portion of the radio resource control signal message; at block 1630 receiving, from the radio access network node, a second portion indication comprising a third set of one or more second segment identifiers indicative of a fourth set of corresponding one or more segments of the second portion of the radio resource control signal message; and at block 1635 wherein the first decoding rate and the second decoding rate are different.

Figure 17:
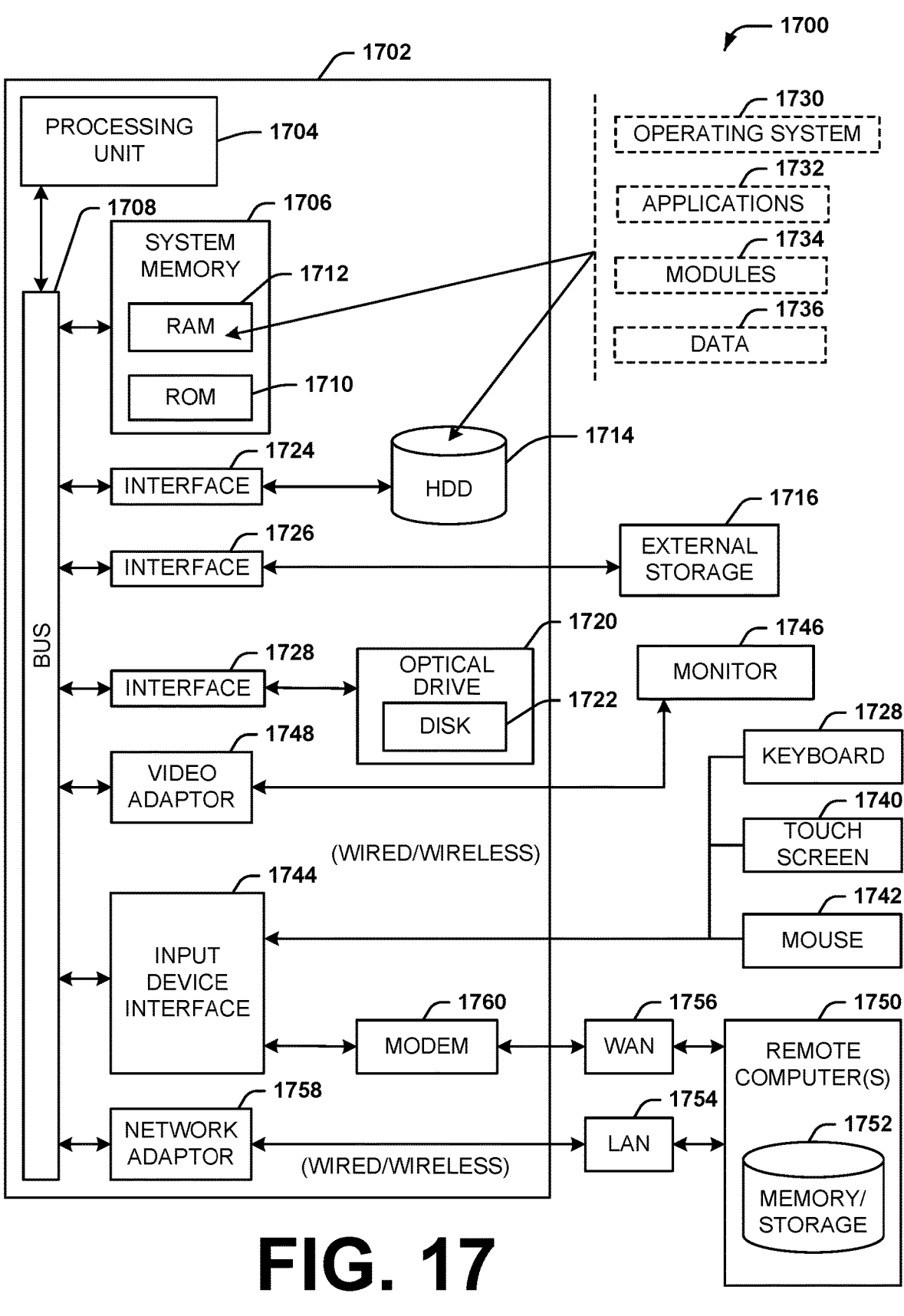
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual micro-processors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
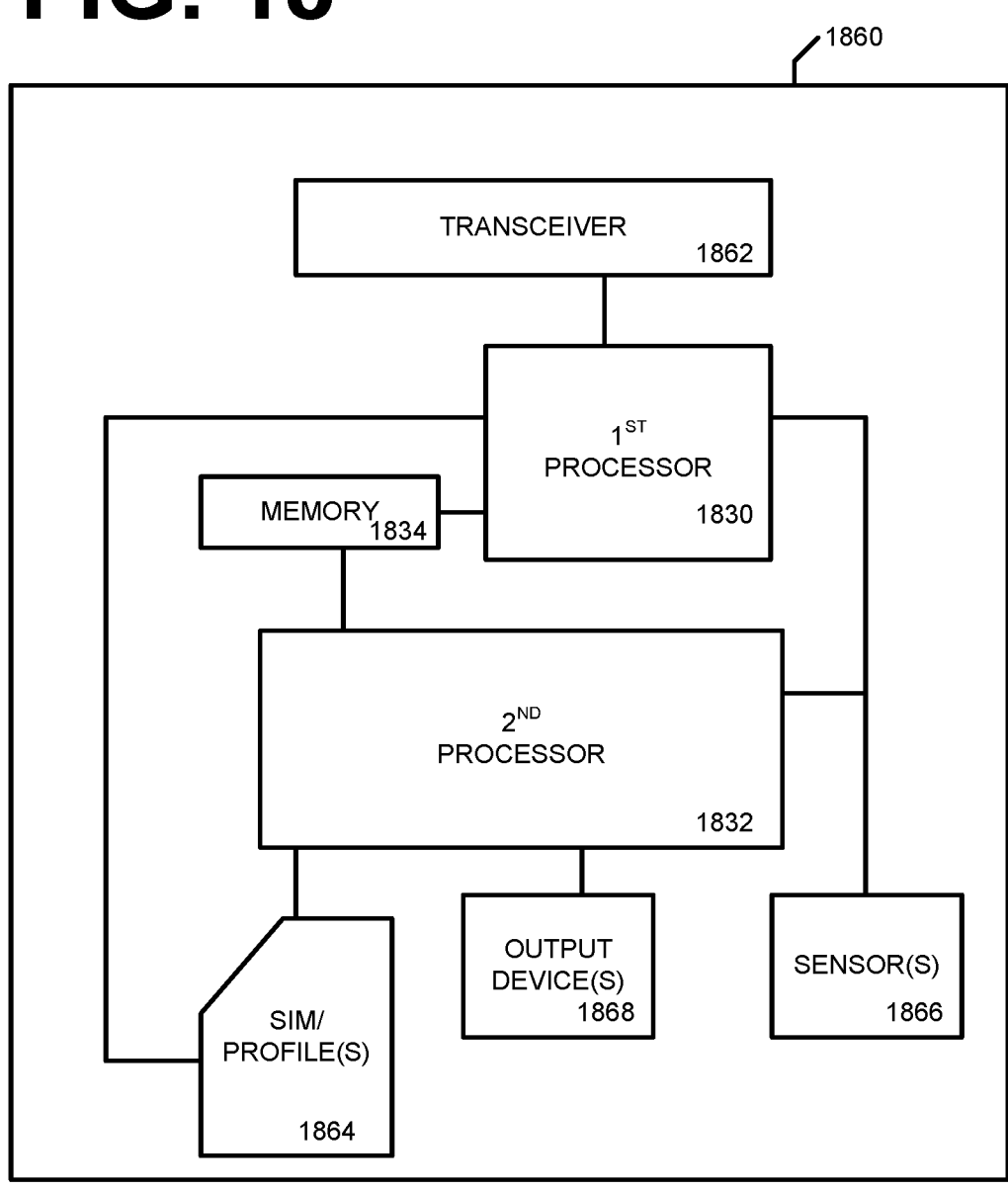
FIG. 18 illustrates a block diagram of an example wireless UE.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (i.e., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, that are external to UE 1860.

The following glossary of terms given in Table 2 may apply to one or more descriptions of embodiments disclosed herein.

TABLE 2

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |

TABLE 2-continued

| Term | Definition |
| --- | --- |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

transmitting, by a radio access network node comprising a processor to a user equipment according to a first encoding format, control channel information corresponding to a communication session between the radio access network node and the user equipment, and transmitting, by the radio access network node to the user equipment according to a second encoding format, artificial intelligence model information, wherein the first encoding format and the second encoding format are different, wherein the control channel information is transmitted in a first radio resource control signal message and the artificial intelligence model information is transmitted in a second radio resource control signal message, and wherein the first radio resource control signal message comprises a radio resource format indication indicative of control channel signal segments used to transmit the artificial intelligence model information in the second radio resource control signal message.

2. The method of claim 1, wherein the first encoding format corresponds to a first rate, wherein the second encoding format corresponds to a second rate, and wherein the first rate is lower than the second rate.

3. The method of claim 1, wherein the control channel information and the artificial intelligence model information are transmitted in a radio resource control signal message.

4. The method of claim 3, wherein the control channel information and the artificial intelligence model information are transmitted in a control channel message.

5. The method of claim 3, wherein the radio resource control signal message comprises a radio resource control signal message format indication indicative of the first encoding format.

6. The method of claim 3, wherein the radio resource control signal message comprises a radio resource control signal message format indication indicative of the second encoding format.

7. The method of claim 3, wherein the control channel information is transmitted via a primary portion of the radio resource control signal message, and wherein the artificial intelligence model information is transmitted via a secondary portion and a tertiary portion of the radio resource control signal message.

8. The method of claim 3, wherein the control channel information is transmitted via a primary portion of the radio resource control signal message, and wherein the artificial intelligence model information is transmitted via at least a secondary portion of the radio resource control signal message.

9. The method of claim 8, wherein the radio resource control signal message comprises a first radio resource format indication indicative of a first number of control channel signal segments used to transmit the control channel information in the primary portion of the radio resource control signal message.

10. The method of claim 9, wherein the radio resource control signal message comprises a second radio resource format indication indicative of second control channel signal segments used to transmit the artificial intelligence model information in the secondary portion of the radio resource control signal message.

11. The method of claim 1, wherein the control channel information and the artificial intelligence model information are transmitted in a radio resource control signal message, wherein the control channel information is transmitted via a primary portion of the radio resource control signal message and wherein the artificial intelligence model information is transmitted via a secondary portion of the radio resource control signal message, wherein the radio resource control signal message comprises a first radio resource format indication indicative of a first set of one or more first control channel signal segments used to transmit the control channel information via the primary portion of the radio resource control signal message, and indicative of a second set of one or more first sequential segment identifiers corresponding, respectively, to the first set of one or more first control channel signal segments, wherein the radio resource control signal message comprises a second radio resource format indication indicative of a third set of one or more second control channel signal segments used to transmit the artificial intelligence model information via the secondary portion of the radio resource control signal message, and indicative of a fourth set of one or more second sequential segment identifiers corresponding, respectively, to the third set of one or more second control channel signal segments, and wherein a first first sequential segment identifier of the second set of one or more first sequential segment identifiers is the same as a first second sequential segment identifier of the fourth set of one or more second sequential segment identifiers.

12. The method of claim 1, wherein the radio resource format indication comprises a medium access control (MAC) control element.

13. A radio access network node, comprising:

a processor configured to:

train a radio function artificial intelligence learning model to result in a trained radio function artificial intelligence learning model;

transmit, to a user equipment, control channel information corresponding to a communication session between the radio access network node and the user equipment via a primary portion of a radio resource control signal message, and transmit, to the user equipment, the trained radio function artificial intelligence learning model via a secondary portion of the radio resource control signal message, wherein the primary portion of the radio resource control signal message comprises a radio resource format indication indicative of control channel signal segments of the secondary portion of the radio resource control signal message usable to transmit the trained radio function artificial intelligence learning model.

14. The radio access network node of claim 13, wherein the primary portion of the radio resource control signal message is transmitted according to a first encoding format corresponding to a first reliability, wherein the secondary portion of the radio resource control signal message is transmitted according to a second encoding format corresponding to a second reliability, and wherein the second reliability is lower than the first reliability.

15. The radio access network node of claim 13, wherein the radio resource control signal message comprises a first radio resource format indication indicative of a first control channel signal segment usable to transmit the control channel information via the primary portion of the radio resource control signal message, and wherein the radio resource control signal message comprises a second radio resource format indication indicative of at least one second control channel signal segment usable to transmit the radio function artificial intelligence learning model via the secondary portion of the radio resource control signal message.

16. The radio access network node of claim 15, wherein the first radio resource format indication comprises a first segment identifier corresponding to the first control channel signal segment usable to transmit the control channel information via the primary portion of the radio resource control signal message, wherein the second radio resource format indication comprises at least one second segment identifier corresponding to the at least one second control channel signal segment usable to transmit the radio function artificial intelligence learning model via the secondary portion of the radio resource control signal message, and wherein the radio resource control signal message comprises a retransmission enablement indication to be indicative to the user equipment that requesting, by the user equipment, retransmission of the first control channel signal segment or the second control channel signal segment is enabled.

17. A non-transitory machine-readable medium, comprising executable instructions that, when executed by a processor of a radio access network node, facilitate performance of operations, comprising:

receiving, from at least one user equipment, at least one radio performance metric corresponding to at least one radio performance parameter;

training a radio function learning model with the at least one radio performance metric to result in an updated radio function learning model to be used by the at least one user equipment;

transmitting, to the at least one user equipment via a first portion of a radio resource control signal message according to a first control channel encoding scheme, control channel information; and transmitting, to the at least one user equipment via a second portion of the radio resource control signal message according to a second control channel encoding scheme, the updated radio function learning model, wherein the first portion of the radio resource control signal message comprises a radio resource format indication indicative of control channel signal segments usable to transmit the updated radio function learning model via the second portion of the radio resource control signal message.

18. The non-transitory machine-readable medium of claim 17, wherein the first control channel encoding scheme and the second control channel encoding scheme are different.

19. The non-transitory machine-readable medium of claim 17, wherein the first portion of the radio resource control signal message comprises one or more first control channel signal segments, wherein the second portion of the radio resource control signal message comprises one or more second control channel signal segments, wherein the radio resource control signal message comprises a first radio resource format indication comprising one or more first segment identifiers corresponding, respectively, to the one or more first control channel signal segments, and wherein the radio resource control signal message comprises a second radio resource format indication comprising one or more second segment identifiers corresponding, respectively, to the one or more second control channel signal segments.

20. The non-transitory machine-readable medium of claim 19, wherein the radio resource control signal message comprises a first retransmission enablement indication to be indicative to the user equipment that requesting, by the user equipment, retransmission of at least one of the one or more first control channel signal segments is enabled, and wherein the radio resource control signal message comprises a second retransmission enablement indication to be indicative to the user equipment that requesting, by the user equipment, retransmission of at least one of the one or more second control channel signal segments is enabled.

* * * * *